United States Patent
Markey et al.

(10) Patent No.: US 9,734,722 B1
(45) Date of Patent: Aug. 15, 2017

(54) INTERACTIVE FLIGHT STATUS DISPLAY

(71) Applicant: Delta Air Lines Inc., Atlanta, GA (US)

(72) Inventors: Laura Markey, Atlanta, GA (US);
Jonathan Mayfield, Atlanta, GA (US);
Jonathan Reiling, Washington, DC (US); Javier Otero, Washington, DC (US); Taran Reese, Washington, DC (US); PJ Cook, London (GB);
Christopher Porter, Atlanta, GA (US);
Daniel DuVal, Atlanta, GA (US)

(73) Assignee: Delta Air Lines, Inc., Atlanta, GA (US)

(*) Notice: Subject to any disclaimer, the term of this patent is extended or adjusted under 35 U.S.C. 154(b) by 204 days.

(21) Appl. No.: 14/580,903

(22) Filed: Dec. 23, 2014

Related U.S. Application Data

(60) Provisional application No. 61/919,860, filed on Dec. 23, 2013.

(51) Int. Cl.
*G08G 5/00* (2006.01)
*G01C 21/00* (2006.01)
*G01C 21/20* (2006.01)
*G08C 21/00* (2006.01)

(52) U.S. Cl.
CPC .......... *G08G 5/0021* (2013.01); *G01C 21/20* (2013.01); *G08C 21/00* (2013.01)

(58) Field of Classification Search
None
See application file for complete search history.

(56) References Cited

U.S. PATENT DOCUMENTS

| | | |
|---|---|---|
| 8,064,120 B2 | 11/2011 | Callahan et al. |
| 8,116,975 B2 | 2/2012 | Stavaeus et al. |
| 8,594,931 B2 | 11/2013 | Sterkel et al. |
| 8,762,047 B2 | 6/2014 | Sterkel et al. |
| 2010/0005495 A1 | 1/2010 | Stavaeus et al. |
| 2012/0232791 A1* | 9/2012 | Sterkel .................. H04H 60/51 701/454 |
| 2015/0077337 A1 | 3/2015 | Coto-Lopez et al. |

FOREIGN PATENT DOCUMENTS

| | | |
|---|---|---|
| EP | 2851281 | 3/2015 |
| FR | 2961592 | 12/2011 |

* cited by examiner

*Primary Examiner* — Rami Khatib
*Assistant Examiner* — Gerrad A Foster
(74) *Attorney, Agent, or Firm* — King & Spalding

(57) ABSTRACT

An application engine receives flight position data associated with an airplane through a global computing network. The flight position data includes a list of recorded locations of the airplane. Using the list of recorded locations of the airplane, the application engine computes a current position of the airplane and a polling interval. Responsive to calculating the current position of the airplane, the application engine generates a flight status view of the airplane based on the current position of the airplane. The flight status view includes a flight tracker image representative of the airplane's current location and flight path, and one or more visual indicators corresponding to social network data and informative data associated with the current position of the airplane. The application engine periodically updates the flight status view of the airplane using an updated current position of the airplane.

19 Claims, 20 Drawing Sheets

INTERACTIVE FLIGHT STATUS DISPLAY

CROSS-REFERENCE TO RELATED APPLICATIONS

This application claims priority to U.S. Provisional Patent Application No. 61/919,860 filed on Dec. 23, 2013 and entitled "Flight Tracker with Social and Geographic Information and Images," the entire contents of which are hereby incorporated herein by reference.

FIELD OF THE INVENTION

Embodiments of this disclosure relate generally to display systems associated with airplanes, and more particularly to an interactive flight status display associated with an airplane.

BACKGROUND

Often, in-flight entertainment systems are provided onboard an airplane for entertainment of the passengers during the flight. In-flight entertainment systems are known to provide traditional flight tracker displays that show a map of an area above which the airplane is flying along with the current position of the flight. Even though the traditional flight tracker displays provide some information, it lacks interactivity. That is, the passengers are provided only limited ability to interact with the map, such as controlling a zoom of the map, without offering an opportunity for the passengers to learn anything about the location over which the airplane is currently flying. Furthermore, traditional flight tracker displays fail to provide the passengers with the opportunity to connect to social network platforms and share data during the flight.

Conventional in-flight entertainment systems may offer in-flight entertainment through hardware that is native to airplane, such as a seat back display screen and/or a cabin based drop down display screen through which in-flight entertainment services content may be delivered the passengers. However, conventional in-flight entertainment systems may lack the flexibility to allow passengers to enjoy the benefits of the in-flight entertainment services utilizing their personal computing devices. With a growing use of personal computing devices, every passenger may carry his/her own personal computing devices onboard the airplane and may prefer to access in-flight entertainment services through their personal computing devices rather than the conventional seat-based in-flight entertainment system and cabin based in-flight entertainment system. Providing in-flight entertainment services (e.g., rendering interactive flight maps) through the user's personal computing device while onboard an airplane that is in-flight may be quite challenging considering the network bandwidth constraints of the airplane, and the memory and processing constraints of the user's personal computing device.

Therefore, on the basis of the above-discussion, there is a need for a technology that provides an interactive and content rich display in a low bandwidth environment.

SUMMARY

The present disclosure addresses the above-mentioned shortcomings by providing an interactive flight status display that is accessible by a user both onboard the airplane and on the ground through the user's personal computing device.

In an example embodiment, a user access the interactive flight status display through the user's personal computing device. In particular, based on a location, the user's computing device connects to the Internet either through an in-flight Internet service system, such as GoGo Inflight Internet®, or a ground Internet service system. Once the Internet connectivity is established, the user's personal computing device communicates with one or more terrestrial servers via the Internet to transmit and receive data that is used to render the interactive flight status display.

Specifically, the user's personal computing device generates and transmits a flight locate request to a terrestrial server, such as a flight status server. Upon receiving the flight locate request, the flight status server transmits the flight locate request to a ground station server that periodically receives and stores a near real-time location of the airplane, an altitude of the airplane, and/or a speed of the airplane. Alternatively, the user's personal computing device can transmit the flight locate request directly to the ground station server. In some embodiment, the flight status server may receive and store a near real-time location of the airplane, an altitude of the airplane, and/or a speed of the airplane, instead of the ground station server. The terrestrial server(s) (e.g., flight status server or third party server, such as ground station server) may receive the near real-time location of the airplane, the altitude of the airplane, and the speed of the airplane from an airplane tracking system that is onboard the airplane. In one example, the onboard tracking system may be a digital datalink system for transmission of short messages between aircraft and ground stations via airband radio or satellite, such as an Aircraft Communications Addressing and Reporting System (ACARS). That is, the airplane may periodically record and transmit its location, speed, and altitude to a server on the ground via cellular towers or satellites.

Responsive to receiving the flight locate request, the ground station server or the flight status server may transmit flight position data to the user's personal computing device via the Internet. The flight position data includes, inter alia, a list of recorded locations, altitude, and speed of the airplane along with a timestamp representative of time at which the each location, altitude, and speed of the airplane was recorded. Using the flight position data, the user's personal computing device calculates the current position of the airplane, a flight path of the airplane, and a polling interval that determines a rate at which a flight status view is updated.

Once the current position of the airplane is calculated, the user's personal computing device generates and transmits a map request to a map service system, such as Google Maps®, via the terrestrial flight status server. Alternatively, the user's personal computing device can transmit the flight locate request directly to the map service system. The map request includes at least the calculated current position of the airplane. Upon receiving the map request, the map service system may transmit map data associated with a terrestrial area corresponding to the calculated current position of the airplane. The map data may be representative of map images of the terrestrial area over which the airplane is flying corresponding to the current position of the airplane.

In addition to generating and transmitting a map request, once the current position of the airplane is calculated, the user's personal computing device generates and transmits, either directly or through the terrestrial flight status server, a content request to a plurality of social network systems and one or more web information sources. The content request includes at least the calculated current position and a set of filter parameters. On the basis of the calculated current position of the airplane and the filter parameters, the social network systems and/or the web information sources may transmit social network data and/or informative data to the user's personal computing device. The filter parameters may limit the number of data points and the type of data points included in the social network data and the informative data. For example, the filter parameter may include a limit on the number of Wikipedia® articles, limit on the type of articles, a distance limit around the current position, and so on.

Upon receiving the map data, social network data, and/or the informative data, the user's personal computing device processes the received data and renders a flight status view based on the received data. The rendered flight status view includes graphical representation of a map of an area over which the airplane is flying, a flight path of the airplane, a current position, and direction of the airplane, flight statistics information, and a flight progress bar with a slider that is controllable by the user. Further, the rendered flight status view includes one or more visual indicators representative of social network data and informative data associated with the current position of the airplane, where the visual indicators are selectable to display content related to the social network data and informative data. On the basis of whether the user's personal computing device is connected to the Internet via the in-flight Internet service system or the ground Internet service system, the rendered flight status view may or may not include an option to share and/or post in-flight experiences, flight status information, and/or any other appropriate information on one or more social network platforms.

Once an initial flight status view is rendered, the user's personal computing device generates and transmits subsequent flight locate requests based on the calculated polling interval. Responsive to the subsequent flight locate request, the user's personal computing device receives the last recorded location, altitude, and speed of the airplane instead of the list of recorded locations, altitudes, and speeds of the airplane. A location of the airplane that is recorded subsequent to the recording of the calculated current location of the airplane is set as the updated current location of the airplane. Further, an updated current direction of the airplane is determined. Using the update current location and direction of the airplane, the flight status view associated with the airplane is updated. The step of generating subsequent flight locate request and updating the flight status view associated with the airplane using updated current position of the airplane is repeated throughout the journey of the airplane, e.g., till the airplane reaches its destination.

In light of the above discussion, it is apparent that the interactive flight status display described herein enhances user experience, increases interactivity, and offers improvements over conventional flight displays by providing: a) enhanced immersive representation of the in-flight experience while operating within the limited bandwidth constraints of the in-flight Internet service system of the airplane, and limited processing power and storage capability of the user's personal computing device, b) interactive display that is rich in content and includes both generally informative content and content that is customized to the user, c) social network features, and d) universal accessibility using personal computing devices both in-flight and on the ground.

These and other aspects, features, and embodiments of the present invention may be more clearly understood and appreciated from a review of the following detailed description of the disclosed embodiments and by reference to the drawings and claims.

BRIEF DESCRIPTION OF THE FIGURES

Example embodiments are illustrated by way of example and not limitation in the figures of the accompanying drawings, in which.

Figure 1:
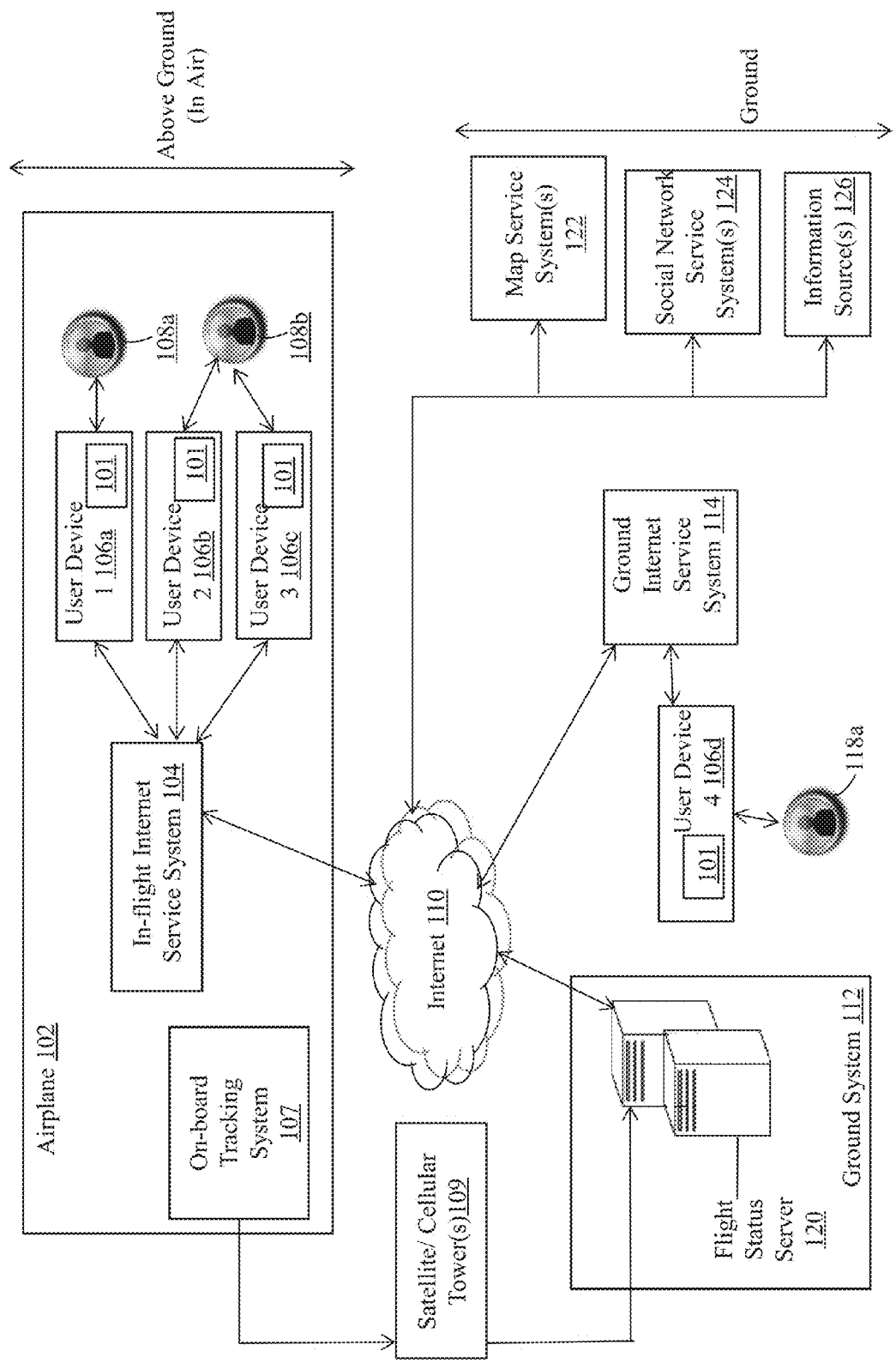
FIG. 1 illustrates an operational environment associated with the interactive flight status display in accordance with an example embodiment.

Many aspects of the disclosure can be better understood with reference to the above drawings. The elements and features in the drawings are not necessarily to scale; emphasis is instead being placed upon clearly illustrating the principles of example embodiments of the present disclosure. Moreover, certain dimensions may be exaggerated to help visually convey such principles. In the drawings, reference numerals designate like or corresponding, but not necessarily identical, elements throughout the several views.

DETAILED DESCRIPTION OF EXAMPLE EMBODIMENTS

Disclosed are a system, apparatus, and method for an interactive flight status display. Before discussing the embodiments directed to the system, apparatus, and method for the interactive flight status display, it may assist the reader to understand the various terms used herein by way of a general description of the terms in the following paragraphs.

The term 'flight locate request,' as used herein may generally refer to any appropriate computer generated message that requests for data associated with a flight and/or operation of an airplane. In one example, the flight locate request may take the form of an application programming interface (API) call, such as a flight locate API call specific to an airline server (Delta server, SouthWest server, etc) or a ground station server (airport server).

The term 'flight position data,' as used herein may generally refer to any appropriate data associated with the flight of the airplane. In one example embodiment, flight position data may refer to any appropriate data that is exchanged between a ground control system and the airplane. In another example embodiment, the flight position data may refer to any appropriate data associated with the navigation, guidance, and control of the airplane. Example flight position data can include, but is not limited to, one or more recorded locations of the airplane, an altitude of the airplane, a speed of the airplane (ground speed), and so on. Each data element of the flight position data is time stamped. The time stamp indicates a time at which each data element is recorded by the airplane. Alternatively, the time stamp may indicate a time at which each data element is received and stored by a storage system on the ground.

The term 'recorded location of the airplane,' as used herein may generally refer to a location of the airplane recorded in near real-time by any appropriate flight data recording equipment onboard the airplane. In addition to recording the location, the equipment may also record an altitude and speed of the airplane. In one example embodiment, an onboard tracking system of the airplane, such as ACARS system onboard the airplane automatically records the location of the airplane, the altitude of the airplane, and the speed of the airplane at pre-defined intervals. Further, the data recorded by the onboard tracking system is transmitted to one or more storage systems (databases or storage servers) on the ground either via cellular towers or via satellite. Alternatively, in another example embodiment, a user (e.g., pilot) may have to manually enter the location, altitude, and speed of the airplane into a system that keeps records of the airplane flight details.

In one embodiment, the term 'position of an airplane,' may generally refer to a location and a direction of the airplane. In another embodiment, the term 'position of the airplane,' may refer to only the location of the airplane without the direction. In one example embodiment, the location of the airplane may be expressed using latitude and longitude values. However, one of ordinary skill in the art can understand and appreciate that location may be expressed using any other appropriate values.

The term 'flight path,' as used herein may generally refer to any appropriate path followed by an airplane through space as a function of time when the airplane is in-flight. In other words, the flight path refers to a route of the airplane. Each route may be between at least two points, that is, a point of departure (departure airport) and a point of arrival (arrival airport).

The term 'area corresponding to current position of the airplane,' as used herein may refer to a terrestrial area corresponding to the current position of the airplane. In other words, the area associated with the current position of the airplane may refer to a terrestrial area over which the airplane is flying corresponding to the current position of the airplane. For example, the current position of the airplane includes location expressed using latitudes and longitude values. In said example, the latitude and longitude values of the airplane may correspond to latitude and longitude values associated with San Francisco indicating that the airplane is currently flying over San Francisco. Accordingly, the area associated with the current position of the airplane in the said example may refer to a terrestrial area that includes San Francisco and/or surroundings of San Francisco, e.g., Bay Area, Napa Valley, etc. In another example, the terrestrial area may include a water body, such as oceans, seas, etc.

The term 'polling interval,' as used herein may generally refer to time difference between subsequent recordings of an airplane's flight position data, i.e., location, altitude, and/or speed. The polling interval may represent a time interval at which a subsequent flight locate request is to be generated after an initial flight locate request. In other words, the polling interval determines the rate at which the flight status view and/or the current position of the airplane are updated. For example, if the polling interval is 2 minutes, then, an updated current position of the airplane that is determined every 2 minutes, and responsively the flight status view is updated every 2 minutes using the updated current position. The current position of an airplane changes with time when the airplane is in-flight.

The term 'content request,' as used herein may generally refer to any appropriate computer generated message that requests for data associated with a social network system and/or data associated with any appropriate information source. For example, content request may be a Facebook® API, Wikipedia® API, etc., that requests for data from Facebook®, Wikipedia®, and so on.

The term 'social network data,' as used herein may generally refer to any appropriate data associated a social network system. Example social network systems may include, but are not limited to, Facebook®, Twitter®, Foursquare®, Instagram®, Pinterest®, Google Plus®, etc. Example social network data may include, but is not limited to, locations and landmarks that a user's social network friend likes or has visited (e.g., Facebook® check-in); a location of residence of the user's social network friend; locations mentioned on messages posted or shared on the user's or the user's friends' social network profiles (e.g., Facebook® posts and/or shares, Twitter® feeds, etc.); a user profile and/or a hyperlink to a user profile, any appropriate messages, events, activities, articles, videos, and/or images and/or hyperlinks associated with messages, events, activities, articles, videos, and/or images posted or shared on user's or the user's friends' social network profiles.

The term 'informative data,' as used herein may generally refer to any appropriate proprietary and publically available information. In some embodiments, the informative data may include hyperlinks to any appropriate proprietary and publically available information. In one example, informative data may include data and/or hyperlinks to data that is curated and customized by an airline or a third party, such as Delta Embark articles, Southwest curated articles, and so on. In another example, informative data may include data and/or hyperlinks to data that is publically available through any appropriate information sources, such as messages, articles, videos, and/or images from Wikipedia®, Wikilocation®, Panoramio®, Google®, News websites, Travel websites, and so on. In yet another example, informative data may include data and/or hyperlinks to data associated with events and activities, such as upcoming sports events, dining reservations, restaurant information, parties, taxi services, hotels, stage shows, etc. In another example, informative data may include data and/or hyperlinks to data associated with partner members of an airline, such as Delta Skymile partners. In another example, informative data may include advertisements and/or hyperlinks to advertisements. In yet another example, informative data may include data and/or hyperlinks to data associated with shopping. One of ordinary skill in the art can understand and appreciate that example informative data included above is not limiting, and any other appropriate proprietary and publically available information is not outside the scope of this description.

The term 'visual indicator,' as used herein may generally refer to any appropriate graphically presented indicator that is computer generated and presented on a computer display. Further, the term 'geo-code,' as used herein generally refers to geographic coordinates.

The term 'map request,' as used herein may generally refer to any appropriate computer generated message that requests for data associated with a map of an area. The term 'map data,' as used herein may generally refer to any appropriate data that represents or is associated with a map of a terrestrial area. The terrestrial area can include land body and/or water body (e.g., oceans, seas, etc.). In one example, map data may include map tiles that may be used to generate a map image. Further, maps can be of different variety, such as terrain maps, satellite maps, street maps, geological maps, weather pattern map, and so on.

The term 'global computing network,' as used herein may generally refer to the Internet or any appropriate global network equivalent to the Internet. The term 'in-flight Internet service system,' as used herein may generally refer to any appropriate system that provides in-flight broadband Internet service and other related network connectivity services on board an airplane. One example in-flight Internet service system is GoGo Inflight Internet®. While the airplane is in-flight, passengers can use their personal computing devices to access the Internet by connecting to the in-flight Internet service system over a wireless and/or wired link. In particular, the in-flight Internet service system may include a gateway device, such as a router that connects the personal computing device of the passenger to the Internet. Similarly, the term 'ground Internet service system,' as used herein may generally refer to any appropriate system on the ground that connects the user to the Internet.

The term 'personal computing device,' as used herein may generally refer to any appropriate portable computing device. Example personal computing devices may include, but are not limited to, laptops, smartphones, tablets, pocket PC's, personal digital assistant (PDA), and so on. In some embodiments, a personal computing device can include stationary computing devices such as desktops, and so on, without departing from a broader scope of this description.

An example interactive flight status display system includes an application engine that runs on a user's personal computing device that may be connected to the Internet either through an in-flight Internet service system or a ground Internet service system. The application engine receives a flight position data associated with an airplane through the Internet. Responsive to receiving the flight position data, the application engine computes a current position of the airplane and a polling interval based on the flight position data. Once the current position of the airplane is calculated, the application engine generates a flight status view based on the calculated current position of the airplane. The generated flight status view is presented to the user via a display of the user's personal computing device. Further, the flight status view is periodically updated based on the updated current position of the airplane till a pre-determined condition is met, e.g., airplane reaches its destination. The rate at which the flight status view is updated depends on the polling interval.

In particular, the flight status view of an airplane graphically presents, among other things, a map of an area over which the airplane is flying at any given moment, a flight path of the airplane, a current position and direction of the airplane, flight statistics information, and a flight progress bar with a slider that is controllable by the user. The slider may be used to view a past position, a current position, and/or a future position of the airplane that is in-flight. The flight status view also provides the ability to zoom and or pan the map.

Further, the flight status view graphically presents social network data and informative data associated with the area over which the airplane is flying at any given moment. The social network data and the informative data are represented using visual indicators positioned on the map at locations corresponding to the geo-code data associated with the social network data and the informative data. The visual indicators are selectable to display content related to the social network data and informative data. The social network data may include data from one or more social network platforms, such as Facebook®, Twitter®, Pinterest®, and so on; and the informative data may include data from one or more public information sources, such as Wikipedia®, Panoramio®, Google®, etc., and one or more proprietary information sources, such as airline data sources. In addition to presenting social network data from the one or more social network platforms, the flight status view provides the user the ability to share and/or post in-flight experiences, flight status information, and/or any other appropriate information on one or more social network platforms. In some embodiments, in addition to sharing and posting, the flight status view may provide features to send messages to and receive messages from other passengers on board the airplane or other user's on a social network platform. Messages can be sent and/or received via the social media platform, or through a customized messaging platform.

As described above, a flight status view presented to a user onboard an airplane that is in-flight may differ from the flight status view presented to a user on the ground. In particular, one of more features available in the flight status view provided to a user onboard an airplane may not be included in the flight status view presented to a user on the ground. For example, one or more visual indicators representative of informative data, and the ability to share or post data on social network platforms may not be available in the flight status view presented to a user on the ground.

Technology associated with the interactive flight status display will now be described in greater detail with reference to FIGS. 1-14, which describe representative embodiments of the system, method, and apparatus for interactive flights status display. It will be appreciated that the various embodiments discussed herein need not necessarily belong to the same group of example embodiments, and may be grouped into various other embodiments not explicitly disclosed herein. First, FIG. 1 will be discussed in the context of describing a representative operating environment associated with the interactive flights status display according to certain example embodiments. Then, FIGS. 2-13 will be discussed, making exemplary references to FIG. 1 and FIG. 14 as may be appropriate or helpful.

In the following description, for purposes of explanation, numerous specific details are set forth in order to provide a thorough understanding of the various embodiments. Further, the system, method, and apparatus for interactive flight status display may be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting and among others supported by representations of the present invention.

Turning to FIG. 1, this figure illustrates an operational environment associated with the interactive flight status display in accordance with an example embodiment. In particular, FIG. 1 illustrates an airplane 102, an in-flight Internet service system 104, a plurality of users onboard the airplane 108a-b (herein 'passengers'), a plurality of user devices 106a-d (herein interchangeably used as 'personal computing device'), an application engine 101 associated with the personal computing device 106, an onboard tracking system 107, a satellite or cellular tower 109, Internet 110, a ground system 112, a flight status server 120, a ground Internet service system 114, a map service system 122, a social network service system 124, and an information source 126.

As illustrated in FIG. 1, the operating environment 100 associated with the interactive flight status display may include one or more systems on the ground, such as the ground system 112, the map service system 122, the social network service system 124, and the information source 126. Each of the systems on the ground (112, 122, 124, and 126) may include one or more computing devices and their corresponding storage devices, e.g., servers and databases that handle the operations of the respective system. Each of the systems on the ground (112, 122, 124, and 126) may be communicatively coupled to the Internet 110 over a wired or wireless network, thus providing each system a web presence. In other words, each system may be accessible via the Internet 110.

In one example embodiment, the ground system 112 may be associated with an airline associated with the airplane 102. For example, if the airplane 102 is associated with Delta airlines, then, the ground system 112 may be a Delta airline ground system 112. Alternatively, the ground system 112 may be associated with another third party that stores data related to an airplane's flight, guidance, control, and/or navigation. As illustrated in FIG. 1, the ground system 112 may include a flight status server 120 that may be configured to receive and store flight position data associated with the airplane 102 that is later used for generating the interactive flight status display. Alternatively, the flight position data may be stored in another server, such as a ground station server or an air traffic control server. In the embodiment where the flight position data is stored in another server, the flight status server 120 may be configured to retrieve the flight position data from the other server upon receiving a request for the flight position data. The flight position data may include, but is not limited to, a location, an altitude, and/or a speed of the airplane. In particular, an onboard tracking system 107 of the airplane 102 may be configured to periodically record flight position data associated with the airplane 102 while the airplane 102 is in flight. The recorded data may be transmitted through one or more satellites or cellular towers 109 to a server or a database on the ground, such as the flight status server 120 of the ground system 112. In some embodiments, a pilot or a crew of the airplane may have to manually record/enter the data for transmission to the ground system 112. In either case, responsive to receiving the flight position data, the flight status server 120 may store the recorded data.

In addition to receiving and storing the flight position data, the flight status server 102 may be configured to receive flight locate requests, decode the flight locate requests, and transmit requested flight position data requested by the flight locate request. Even though the flight status server 120 is described in the context of handling flight position data, one of ordinary skill in the art can understand and appreciate that the flight status server 102 can store and handle any other appropriate data, such as information about one or more locations, loyalty points, rewards, and so on, without departing from the broader scope of this disclosure.

One of the other systems on the ground is the map service system 122 illustrated in FIG. 1. The map service system 122 may include any appropriate system that is associated with a web mapping service. Web mapping may refer to a process of using maps delivered by geographical information systems (GIS) over the Internet. Example map service systems may include, but are not limited to, Google Maps service, Yahoo Maps service, Mapquest map service, WikiMapia, and so on.

Another system on the ground is the social network system 124 illustrated in FIG. 1. The social network service system may include any appropriate system that facilitates social networking and/or offers social networking services. Example social network service systems that are known worldwide may include, but are not limited to, as Facebook, Google Plus, YouTube, LinkedIn, Instagram, Pinterest, Vine, Tumblr, and Twitter. However, there may be other social network service systems that may be local and customized to specific countries, such as Nexopia, Badoo, Bebo, Myspace, Xanga, Hi5, Orkut, Friendster, and so on.

In addition to the social network service system 124, FIG. 1 illustrates one or more information sources 126. An information source 126 may include any appropriate system that provides proprietary and/or public information. The information source 126 may have a web presence. In other words, the information source 126 may accessible over the Internet. In one example, the information source 126 may include a web source or a database that provides magazine articles, such as the National Geographic website, Time magazine website, Sports Illustrated website, Travel websites, and so on. In another example, the information source 126 may include a web source or a database that provides newspaper articles or academic journal articles. In yet another example, the information source 126 may include a web encyclopedia, such as Wikipedia®. In another example, the information source 126 may include a web source or a database that provides data from image mashup services or video services, such as Panoramio®, Youtube®, and so on. In one example embodiment, even the flight status server 120 may be identified as an information source 126. One of ordinary skill in the art can understand and appreciate that the examples of the information sources provided above are not limiting, and any other type of information source is not outside the scope of this disclosure.

In addition to the one or more systems on the ground, the operating environment 100 may include one or more components aboard an airplane 102. In the example embodiment illustrated in FIG. 1, the airplane 102 may include one or more passengers 108a,b. Each passenger 108a,b may have one or more of their own personal computing devices 106a-c that may be connected to the Internet 110 via the in-flight Internet service system 104. Further, each personal computing device 106 may include an application engine 101 that may be implemented as software, specially designed hardware, or a combination of software and hardware.

The application engine 101 may be configured to generate and present an interactive flight status display to the passenger 108 via an output medium of the personal computing device 106. The interactive flight status display may be generated based on data received from one or more systems on the ground, such as flight status server 120, the map service system 122, the social network service system 124, and the information sources 126. In particular, the personal computing device 106 of the passenger 108 may be communicatively coupled to the computing devices of the one or more systems on the ground (112, 122, 124, and 126) via the Internet 110. Accordingly, using the personal computing device 106, the application engine 101 communicates with the computing devices associated with the one or more systems on the ground via the Internet 110 to receive appropriate data for generating the interactive flight status display.

Similar to the passengers 108a,b onboard the airplane 102, a user 118 on the ground may also have a personal computing device 106d, as illustrated in FIG. 1. The personal computing device 106d of the user 118 on the ground may be connected to the Internet via a ground Internet service system 114. Further, the personal computing device 106d of the user 118 on the ground may include an application engine 101 that is configured to generate and present an interactive flight status display associated with the airplane 102 to the user 118 on the ground via an output medium of the personal computing device 106d. However, the interactive flight status display presented to a passenger 108 on board an airplane 102 that is in-flight may differ from the interactive flight status display presented to a user 118 on the ground. In particular, the interactive flight status display presented to the user 118 on the ground may not include one or more features available in the interactive flight status display presented to the passenger 108 onboard the airplane 102, e.g., sharing or posting data on social networking websites.

Figure 2:
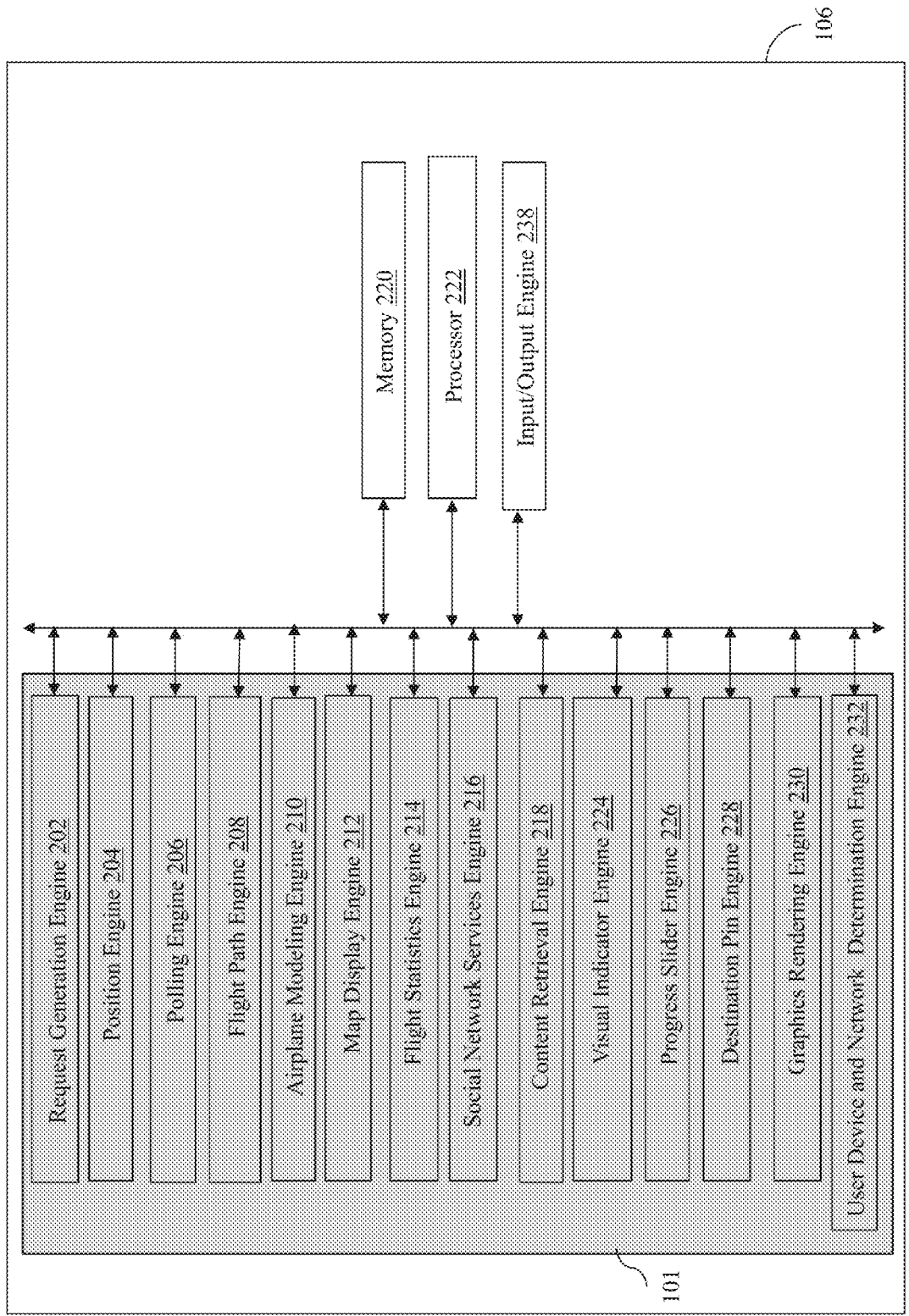
FIG. 2 illustrates a block diagram of the application engine associated with the personal computing device in accordance with an example embodiment.

Architecture of the application engine 101 associated with the personal computing device 106 will be described below in greater detail in association with FIG. 2. Turning to FIG. 2, this figure illustrates a block diagram of the application engine associated with the personal computing device, in accordance with an example embodiment. In particular, FIG. 2 illustrates that a personal computing device 106 includes a memory 220, a processor 222, an input/output engine 238, and an application engine 101. Further, the application engine 101 includes a request generation engine 202, a location and bearing calculation engine 204 (herein 'position engine'), a polling engine 206, a flight path engine 208, an airplane modeling engine 210, a map display engine 212, a flight statistics engine 214, a social network services engine 216, a content retrieval engine 218, a visual indicator engine 224, a progress slider engine 226, a destination pin engine 228, a graphics rendering engine 230, and a user device and network determination engine 232.

In one embodiment, the processor 222 of the personal computing device 106 may be a multi-core processor. In another embodiment, the processor 222 may be a combination of multiple single core processors. Further, the processor 222 may be coupled to a memory 220 of the personal computing device 106. The memory 220 may be non-transitory storage medium, in one embodiment, and a transitory medium in another embodiment. The memory 220 may include instructions that may be executed by the processor 222 to perform operations of the personal computing device 106 and the application engine 101. In other words, operations associated with personal computing device 106 and the different engines of the application engine 101 may be executed using the processor 222.

In addition to the memory 220 and the processor 222, the personal computing device 106 may include an input/output engine 238 that is configured to enable communication to and from the personal computing device 106. In particular, the input/output engine 238 may be configured to receive input from the one or more systems on the ground, i.e., the ground system 112, the map service system 122, the social network service system 124, and the information source 126. In addition, the input/output engine 238 may be configured to receive a user input resulting from a user's interaction with the personal computing device 106. In response to receiving the input from the one or more systems on the ground and/or the user input, the personal computing device 106 and/or the application engine 101 may generate one or more outputs. The input/output engine 238 may be configured to either present the generated output to the user (108, 118) via a display medium (not shown in Figure) of the personal computing device 106 or transmit the generated output for other operations.

Although not shown in FIG. 2, the personal computing device 106 may include a data communications engine that is configured to connect the personal computing device 106 to a network, such as the Internet 110. In particular, the data communications engine may be configured to connect the personal computing device 106 to an Internet service system, such as the in-flight Internet service system 104 or the ground Internet service system 114, which in turn connects the personal computing device 106 to the Internet 110.

In one example embodiment, a user (108, 118) may switch on the user's personal computing device 106 and express intent to view an interactive flight status display associated with an airplane 102 that is in-flight. Responsively, the application engine 101 may receive a request to generate the interactive flight status display associated with the airplane 102. The application engine may forward the request to the user device and network determination engine 232.

In response to receiving the request to present the interactive flight status display, the user device and network determination engine 232 may be configured to communicate with: a) the processor 222 of the personal computing device 106 to determine one or more technical specifications of the personal computing device 106, and b) the data communication engine of the personal computing device 106 to determine whether the personal computing device 106 is connected to the Internet via an in-flight Internet service system 104 or a ground Internet service system 114.

In an example embodiment, the technical specification of the personal computing device 106 may determine the resolution and complexity of the images rendered in association with the interactive flight status display. For example, if the technical specifications of the personal computing device 106 do not meet a set of requirements for a three-dimensional map display, a two dimensional map image may be rendered instead of a three dimensional map image. One of ordinary skill in the art can understand and appreciate that complexity and resolution are only example characteristics and are not limiting. In other words, any other characteristic of the interactive flight status display may be modified based on the technical specifications of the personal computing device 106.

Further, in an example embodiment, a determination of the Internet service system through which the personal computer device 106 is connected to the Internet may further determine the features that are made available to a user (108, 118) through the interactive flight status display. For example, if the personal computing device 106 is connected to Internet via the ground Internet service system 114, the interactive flights status display presented to the user (108, 118) may not include an option to share and/or post messages to one or more social network platforms. One of ordinary skill in the art can understand and appreciate that the examples provided above are not limiting, and any other appropriate feature may be added or deleted based on the presence of Internet connectivity and the type of Internet connectivity without departing from a broader scope of this disclosure. For example, if the personal computing device 106 is not connected to Internet, flight tracking features, social network features, and other appropriate features may not be available to the user (108, 118).

Responsive to determining the technical specifications and the Internet connectivity details of the personal computing device 106, the user device and network determination engine 232 may forward the request associated with generating the interactive flight status display to the request generation engine 202. In response, the request generation engine 202 may be configured to generate a flight locate request. The flight locate request may include at least a flight identifier that identifies the airplane 102 for which the interactive flight status display is to be generated. Once the flight locate request is generated, the request generation engine 202 communicates the flight locate request to the data communication engine of the personal computing device 106 with a destination address to which flight locate request is to be transmitted. Responsive to receiving the flight locate request and the destination address, the data communication engine of the personal computing device 106 transmits the flight locate request to the flight status server 120.

Upon receiving the flight locate request, the flight status server 120 may decode the flight locate request and retrieve the flight identifier to identify the airplane 102. Responsive to identifying the airplane 102, the flight status server 120 may transmit flight position data associated with the identified airplane 102 to the personal computing device 106.

In one example embodiment, the flight position data that is transmitted to the personal computing device 106 may vary based on a type or time stamp of the flight locate request. For example, if the flight locate request is an initial flight locate request for the airplane 102, the flight position data may include a list of all recorded locations, altitudes, and speeds of airplane 102 from the departure of the airplane 102 till the time the initial flight locate request is received. Alternatively, if the flight locate request is a subsequent flight locate request for airplane 102, i.e., a flight locate request for airplane 102 that arrived after the initial flight locate request for airplane 102, the flight position data may only include the last recorded location, altitude, and speed of airplane 102. In another example embodiment, the flight locate request may instruct the flight status server 120 regarding the data elements that are to be included in the flight position data. Alternatively, the flight locate request may include another identifier that indicates if the flight locate request is an initial request or a subsequent request. In either case, once the flight locate request is received, the flight status server 120 transmits flight position data to the personal computing device 102.

The input/output engine 238 of the personal computing device 106 may receive the flight position data. Further, the input/output engine 238 may store the flight position data in the memory 220 of the personal computing device 106. Once the flight position data is stored in the memory 220, the input/output engine 238 may transmit the flight position data to the position engine 204 and the polling engine 206.

Upon receiving the flight position data, the position engine 204 and the polling engine 206 may be configured to calculate a current position of the airplane 102 and/or a polling interval, respectively. In particular, the position engine 204 may be configured to calculate a current location and a current direction of the airplane 102, and a polling engine 206 may be configured to calculate the polling interval. In one example, the current location of the airplane 102 may be represented as geographic coordinate values, e.g., latitude and longitude values.

Responsive to calculating the current position of the airplane 102, the position engine 204 transmits the calculated current position of the airplane 102 to the map display engine 212, the social network service engine 216, and the content retrieval engine 218.

Responsive to receiving the current position of the airplane 102, the map display engine 212 may operate in conjunction with the request generation engine 202 to generate a map request. The map request includes at least the calculated current location of the airplane. In some embodiments, the map request may also include dimension parameters such as a form factor of a display medium of the personal computing device 106, zoom parameters (zoom in or zoom out), and/or altitude at which the airplane 102 is flying. Once the map request is generated, the map display engine 216 communicates the map request to the data communication engine of the personal computing device 106 with a destination address to which map request is to be transmitted. Responsive to receiving the map request and the destination address, the data communication engine of the personal computing device 106 transmits the map request to the map service system 122.

Upon receiving the map request, the map service system 122 may decode the map request to retrieve the current location and/or the dimension parameters. Responsively, using the current location of the airplane 102 and/or the dimension parameters, the map service system 122 may retrieve map data associated with a terrestrial area corresponding to the calculated current position of the airplane 102. The map data may represent a map image of the terrestrial area over which the airplane 102 is flying at its calculated current location. The map image may be terrain view image, a street view image, a satellite view image, or any other appropriate view. Further, the dimensions of the terrestrial area for which a map image is retrieved may be determined based on the dimension parameters included in the map request. For example, the map service system 122 may determine the longitude and latitude values that represent the current location of the airplane 102. In said example, the longitude and latitude values may be X and Y. Responsive to determining the longitude and latitude values, the map service system 122 determines a terrestrial location that substantially matches with the longitude and latitude values that represent the current location of the airplane 102. In said example, the coordinates X, Y may substantially match the coordinates of San Francisco. Further, the dimension parameters may include a form factor of the personal computing device 106 and an indication that a user (108, 118) has requested a zoomed in view. Accordingly, the map service system 122 may retrieve a map image of San Francisco without the neighboring locations. However, if the dimension specifications indicated that a user (108, 118) requested a zoomed out view, the map service system 122 may have retrieved a map image of San Francisco and its surrounding locations, e.g., Bay Area, Napa Valley, and so on. Similarly, a map image for a larger area may be retrieved for a device having a larger form factor as compared to a device having a smaller form factor. In addition, dimensions of the area for which map image is retrieved may vary based on the altitude at which the airplane is flying. Furthermore, the type of map image (e.g., terrain view, satellite view, two dimensional map image, three dimensional map image, etc.) that is to be included in the map data may depend on the available network bandwidth and the technical specification of the personal computing device 106 (e.g., processing power). In a preferred embodiment, a two-dimensional terrain map view may be used in light of the limited network bandwidth environment onboard the airplane 102.

As described above, in addition to transmitting the calculated current position of the airplane 102 to the map display engine 212, the position engine 204 also transmits the calculated current location to the social network service engine 216 and the content retrieval engine 218. Responsive to receiving the current position of the airplane 102, the social network service engine 216 and the content retrieval engine 218 may be configured to generate a content request. The content request may include at least the calculated current location of the airplane, and a set of filter parameters. The set of filter parameters may include, but are not limited to a number of data elements that are to be returned in response to the content request, type of data that is be returned, and a distance limit associated with the current location of the airplane 102. For example, a content request generated by the content retrieval engine 218 may request for Wikipedia articles related to landmarks in an area above which the airplane 102 is flying. The content request may include the longitude and latitude values that represent the current location of the airplane 102, the number of articles that are to be returned, and radius value indicating that only articles related to landmarks located within the radius value should be returned. In said example, assume that the longitude and latitude values that represent the current location of the airplane 102 correspond to the longitude and latitude values of Midtown, Atlanta; and the content request includes an article limit of 10, and a distance limit of 15 miles. In said example, in response to the content request only 10 articles that are related to landmarks within a 15 mile radius of Midtown, Atlanta will be returned. Similar or different filter parameters may be used for content request generated by the social network service engine 216.

In either case, once the content request is generated, the social network service engine 216 and the content retrieval engine 218 may communicate their respective content request to the data communication engine of the personal computing device 106 with a destination address to which content request is to be transmitted. The destination address may vary based on whether the content request is generated by the social network service engine 216 or the content retrieval engine 218. That is, content request generated by the social network service engine 216 may be addressed to the social network service system 124, and the content request generated by the content retrieval engine 218 may be addressed to the one or more information sources 126. Responsive to receiving the content request and the destination address, the data communication engine of the personal computing device 106 transmits the content request to the social network service system 124 and/or the one or more information sources 126.

Upon receiving the content request, the social network service system 124 may decode the content request to retrieve the current location and set of filter parameters. Further, using the current location of the airplane 102 and the set of filter parameters, the social network service system 124 may retrieve the requested social network data. In an example embodiment, the social network data may include one or more data elements and/or a geographic coordinate associated with each data element. The data elements may include content snippet, full content, and/or a hyperlink to the content. For example, if the airplane is flying over Atlanta, based on the content request, the social network data may include a list of the user's Twitter friends that live in and around a 10 miles radius Atlanta. Further, the social network data may include a geographic coordinate that represent the location of each Twitter friend. Furthermore, the social network data may include at least a portion of the tweets associated with each Twitter friend and/or a hyperlink to the tweets and the friend's user profile. In another example, if the airplane is flying over Houston, based on the content request, the social network data may include a list of restaurants in and around a 15 mile radius of Houston that the user's Facebook friends have visited and checked-in using Facebook®. Further, the social network data may include a geographic coordinate that represent the location of each restaurant in the list of restaurants. Furthermore, the social network data may include at least a portion of the names, reviews, and information associated with the restaurants or corresponding hyperlinks. One of ordinary skill in the art can understand and appreciate that the examples of social network data provided above is for explanatory purposes, and is not limiting. In other words, some of the data elements may be deleted and others new data elements may be added without departing from a broader scope of this disclosure.

Similar to the social network service system 124, upon receiving the content request, the one or more information sources 126 may decode the content request to retrieve the current location and set of filter parameters. Further, using the current location of the airplane 102 and the set of filter parameters, the one or more information sources 126 may retrieve the requested informative data. In an example embodiment, the social network data may include one or more data elements and/or a geographic coordinate associated with each data element. The data elements may include content and/or hyperlinks to the content.

The social network service system 124 and the one or more information sources 126 may transmit the social network data and informative data to the personal computing device 106 over the Internet 110, respectively. Furthermore, in response to the map request, the map service system 122 may transmit the map data to the personal computing device 106 over the Internet 110.

The input/output engine 238 of the personal computing device 106 may receive the map data, social network data, and/or the informative data. Further, the input/output engine 238 may communicates with the processor 222 to store the map data, social network data, and/or the informative data in the memory 220 of the personal computing device 106. In some embodiments, the map data, social network data, and/or the informative data may not be stored in the memory 220. In either case, upon receiving the map data, social network data, and/or the informative data, the input/output engine 238 may transmit the map data, social network data, and/or the informative data to the graphics rendering engine 230. In addition to the map data, social network data, and/or the informative data, the graphics rendering engine 230 may also receive the flight position data and the calculated current position of the airplane 102 from the position engine 204.

Responsive to receiving the calculated current position of the airplane 102, map data, social network data, informative data, and/or flight position data, the graphics rendering engine 230 may be configured to generate a flight status view for display to the user (108, 118) via a display medium of the personal computing device 106.

In particular, using the map data, the graphics rendering engine 230 may render a map image of the terrestrial area corresponding to the current location of the airplane 102. In some embodiment, the graphics rendering engine 230 may apply coordinate transformation to the map data to render a three-dimensional map image, provided the technical specifications of the personal computing device 106 meets one or more requirement set by the application engine 101. Further, the graphics rendering engine 230 may transmit the flight position data and the calculated current position of the airplane 102 to the flight path engine 208. Using the calculated current position of the airplane 102 and the list of previous recorded locations of the airplane 102, the flight path engine 208 may be configured to calculate the flight path of the airplane 102. Then, the flight path engine 208 operates in concert with the he graphics rendering engine 230 to render a flight path image within the map image. Furthermore, the graphics rendering engine 230 operates in concert with the airplane modeling engine 210 to render a two-dimensional or three-dimensional airplane image in the map image to indicate a current location and direction of the airplane. Additionally, the graphics rendering engine 230 and the airplane modeling engine 210 operate in concert to generate an image representative of a shadow of the airplane 102 on the map image. The image representative of a shadow of the airplane 102 may be placed at a location on the map that corresponds to a terrestrial location over which the airplane is flying. In some embodiments, the shadow image may be offset from the location on the map that corresponds to a terrestrial location over which the airplane is flying. One of ordinary skill in the art can understand and appreciate that any other markers may be used to indicate a current location and direction of the airplane without departing from a broader scope of this disclosure. Further, one of ordinary skill in the art can understand and appreciate that in some embodiment, the shadow image may be omitted without departing from a broader scope of this disclosure.

In an example embodiment, the graphics rendering engine 230 may filter the received social network data and informative data to remove data that includes any terms that are blacklisted by the application engine 101. Responsive to filtering the social network data and informative data to remove blacklisted content, the graphics rendering engine 230 may transmit the received social network data and informative data to the visual indicator engine 224 and/or the destination pin engine 228. Further, in conjunction with the visual indicator engine 223 and the destination pin engine 228, the graphics rendering engine 230 may be configured to render a visual indicator for each data element in the received social network data and informative data. Each of the rendered visual indicators may be located in the map image at a location corresponding to the geographic coordinates associated with the respective data element. Further, each visual indicator may be selectable to display content associated with the respective social network data and informative data that they represent. Furthermore, the visual indicators may vary based on the data that they represent. For example, Facebook related data may be represented using a Facebook specific visual indicator. Similarly, Twitter and Wikipedia related data may be represented using Twitter and Wikipedia specific visual indicators. In said example, a user (108, 118) may be allowed to click on each of the Facebook, Twitter, and Wikipedia specific indicators using an input medium of the personal computing device 106. Each visual indicator may be associated with a hyperlink. Accordingly, upon clicking, the user (108, 118) may be transferred to a web site represented by a hyperlink. The website may provide additional data. Alternatively, snippets of data may be cached in the personal computing device 106. Accordingly, when a user (108, 118) scrolls over the visual indicator, a portion of data may be displayed within the map image along with a hyperlink that can be followed to access the data in its entirety. In said example, if a user (108, 118) clicks on the Facebook visual indicator that represents the location of a friend, the user (108, 118) may be transferred to the Facebook server and the friend's Facebook user profile page may be presented within the flight status view using a pop-up window. Alternatively, the user (108, 118) may be taken away from the flight status view to a new window. In another example, when the user (108, 118) clicks on the Facebook visual indicator that represents the location of a friend, the user (108, 118) may be presented with the friend's name and a hyperlink to the friend's Facebook user profile page. Further, the pop-up generation may vary based on the data that is being shown. For example, a Twitter pop-up may differ from a Facebook pop-up. Another example visual indicator may include a destination pin that represents data that is curated and customized by an airline associated with the airplane 102.

The graphics rendering engine 230 also operates in concert with the progress slider engine 226 to render an image of a progress bar with a slider. The progress bar may indicate a percentage of travel completed by the airplane 102. Further, the slider may be configured to respond to a user input. In other words the slider may be user controllable to view one or more past positions of the airplane 102 or future positions of the airplane 102. Furthermore, the graphics rendering engine operates in concert with the flight statistics engine 214 to render an image that textually represents the current position, the current direction, and other details associated with the flight, such as flight identifier number, destination port and so on.

In addition, the graphics rendering engine 230 may also be configured to render one or more images that are selectable for posting and/or sharing data on a social network platform. Further, the graphics rendering engine 230 may also generate any other images the result from a selection of the option to post and/or share data on the social network platform.

Once the flight status view is generated using the current position of the airplane 102, the polling engine 206 may be configured to operate in conjunction with the request generation engine 202 to generate a subsequent flight locate request. Further, the polling engine 206 operates in concert with the position engine 206 to compute an update current location. Further, using the updated current location, the application engine 101 updates the flight status view. The update operation is periodically repeated till the airplane 102 completes its current flight.

Even though FIG. 2 illustrates the application engine 101 as a component implemented in the personal computing device 106, one of ordinary skill in the art can understand and appreciate that the application engine can be implemented as a server system on the ground without departing from a broader scope of this description. In one example, if the application engine 101 is implemented as a server system on the ground, the application engine 101 may perform all the operations mentioned above or share some operations with a corresponding client component to render a flight status view. Further, the rendered flight status view may be transmitted to a client component residing on a computing device for display.

The operations of the application engine to generate and present the interactive flight status display is described below in greater detail in association with FIGS. 3-13. As described above, FIGS. 3-13 will be explained by making exemplary reference to FIGS. 1, 2, and 14 as may be appropriate or helpful. Accordingly, turning now to FIGS. 3-13, these figures include flow charts that illustrate the process of the application engine for generating and presenting the interactive flight status display. Although specific operations are disclosed in the flowcharts illustrated in FIGS. 3-13, such operations are exemplary. That is, embodiments of the present invention are well suited to performing various other operations or variations of the operations recited in the flowcharts. It is appreciated that the operations in the flowcharts illustrated in FIGS. 3-9 may be performed in an order different than presented, and that not all of the operations in the flowcharts may be performed.

All, or a portion of, the embodiments described by the flowcharts illustrated in FIGS. 3-13 can be implemented using computer-readable and computer-executable instructions which reside, for example, in computer-usable media of a computer system or like device. As described above, certain processes and operations of the present invention are realized, in one embodiment, as a series of instructions (e.g., software programs) that reside within computer readable memory of a computer system and are executed by the processor of the computer system. When executed, the instructions cause the computer system to implement the functionality of the interactive flight status display system as described below.

Figure 3:
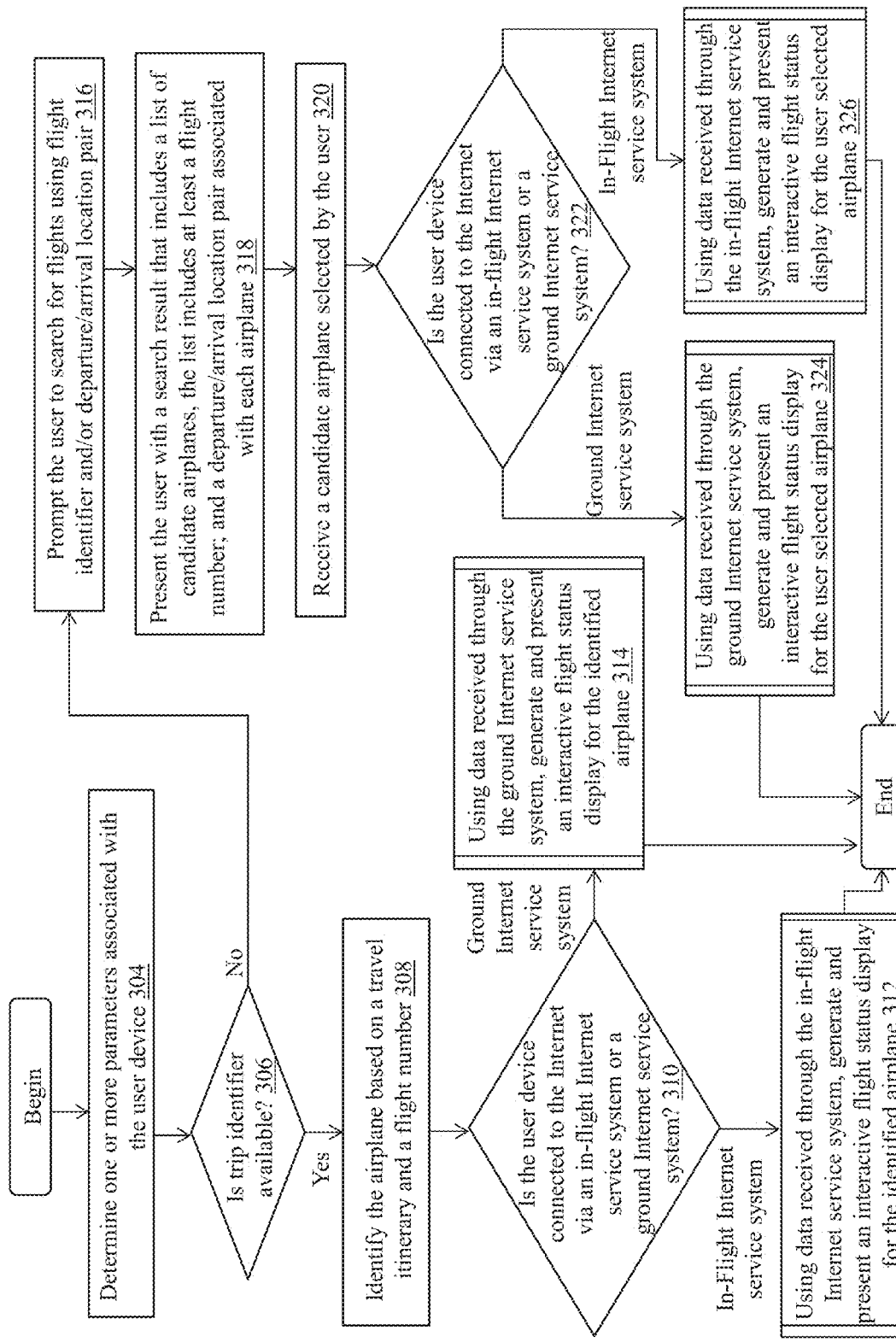
FIG. 3 is a flowchart that illustrates an example method associated with the application engine in accordance with an example embodiment.

Turning to FIG. 3, this figure is a flowchart that illustrates an example method associated with the application engine in accordance with an example embodiment. The method begins in operation 302 where a user (108, 118) switches on the user's personal computing device 106. Responsive to switching on the personal computing device 106, in operation 304, the application engine 101 determines one or more technical specifications associated with the personal computing device 106. Further, in operation 304, the application engine 101 may check if the technical specifications associated with the personal computing device 106 meets a set of requirements for presenting the interactive flight status display. If the technical specifications of the personal computing device meet the display requirements, the application engine 101 proceeds to operation 306. However, in one example embodiment, if the technical specifications of the personal computing device 106 do not meet the set of requirements, prior to proceeding to operation 306, the application engine 101 may generate an alert message for display to the user (108, 118). The alert message may indicate that the technical specifications of the personal computing device 106 do not meet the display requirements and therefore, the interactive flight status display cannot be presented or the interactive flight status display of different quality may be presented. Alternatively, the application engine 101 may proceed to operation 306 without generating the alert.

In operation 306, the application engine 101 may determine whether a trip identifier (e.g., Passenger Name Record (PNR), or any other similar identifiers) is available on the personal computing device 106. For example, the user (108, 118) may have booked a flight using the personal computing device 106 and the trip identifier associated with the flight may be stored in the memory 220 of the personal computing device 106. Alternatively, if the user (108, 118) is logged in as a member, in operation 306, the application engine 101 may determine whether the trip identifier is available based on the user credentials. For example, if the user logs in as a SkyMiles member (by Delta), then, the trip identifier may be accessible via the user's SkyMiles credentials. One of ordinary skill in the art can understand that the methods described above for retrieving a trip identifier are not limiting, and any other appropriate method can be used for identifying the trip identifier without departing from the broader scope of this description. Further, one of ordinary skill in the art can also understand and appreciate that it may not be necessary for a user to be logged in as a member to access the interactive flight status display of an airplane 102. In other words, a user that is logged in as guest may also access the interactive flight status display.

In operation 306, if a trip identifier is available, the application engine 101 proceeds to operation 308. In operation 308, the application engine 101 may retrieve a travel itinerary from the trip identifier. Then, based on the travel itinerary, the application engine 101 may identify the airplane 102 for which the interactive flight status display is to be generated. Responsive to identifying the airplane 102 for which the interactive flights status display is to be generated, in operation 310, the application engine 101 may determine if the personal computing device 106 is connected to the Internet 110 via an in-flight Internet service system 104 or a ground Internet service system 114. If the personal computing device 106 is connected to the Internet via the in-flight Internet service system 104, the application engine 101 proceeds to operation 312 where the application engine 101 may generate and present an interactive flight status display 1400a (shown in FIG. 14A) for the airplane 102 identified by the trip identifier based on data received over the Internet 110 via the in-flight Internet service system 104. Alternatively, if the personal computing device 106 is connected to the Internet via the ground Internet service system 114, the application engine 101 proceeds to operation 314 where the application engine 101 may generate and present an interactive flight status display 1400b (shown in FIG. 14D) for the airplane 102 identified by the trip identifier based on data received over the Internet 110 via the ground Internet service system 114.

Returning to operation 306, if a trip identifier is not available, the application engine 101 proceeds to operation 316. In operation 316, the application engine 101 may prompt the user to search for an airplane 102 using one of a flight number and a departure/arrival location pair. Responsive to the search initiated by the user (108, 118), in operation 318, the application engine 101 presents the user (108,118) with a list of candidate airplanes that match the search criteria. The list may include a flight number and/or the departure/arrival location pair. Further, in operation 318, the application engine 101 prompts the user (108, 118) to select a candidate airplane for which the user (108, 118) desires to view an interactive flight status display. Responsive to the prompt, in operation 320, the application engine 101 receives a user input identifying the airplane 102 selected by the user (108, 118) for which an interactive flight status display is to be generated. In one example embodiment, only airplanes that are in-flight may be made selectable. Various methods may be used to indicate flights that are in-flight, such as a status identifier, color coding, disabling hyperlink, highlights, etc. In another example embodiment, all airplanes in the search result may be made selectable, and the determination of whether the airplane is in-flight may be made after the selection of the airplane. If the airplane is not in-flight, the application engine 101 may generate and present a message to the user (108,118) indicating that an interactive flight status display cannot be generated for the selected airplane. In some embodiments, the interactive flight status display may be generated for airplanes that are on the ground (taxiing, in hangar, etc.) with or without modifications.

Assuming that in operation 310, the airplane 102 selected by the user (108, 118) is in-flight, the application engine 101 proceeds from operation 320 to operation 322 where the application engine 101 may determine if the personal computing device 106 is connected to the Internet via an in-flight Internet service system 104 or a ground Internet service system 114. If the personal computing device 106 is connected to the Internet via the in-flight Internet service system 104, the application engine 101 proceeds to operation 326 where the application engine 101 may generate and present an interactive flight status display 1400a (shown in FIG. 14A) for the user selected airplane 102 based on data received over the Internet 110 via the in-flight Internet service system 104. Alternatively, if the personal computing device 106 is connected to the Internet via the ground Internet service system 114, the application engine 101 proceeds to operation 324 where the application engine 101 may generate and present an interactive flight status display 1400b (shown in FIG. 14D) for the user selected airplane 102 based on data received over the Internet 110 via the ground Internet service system 114.

Figure 4:
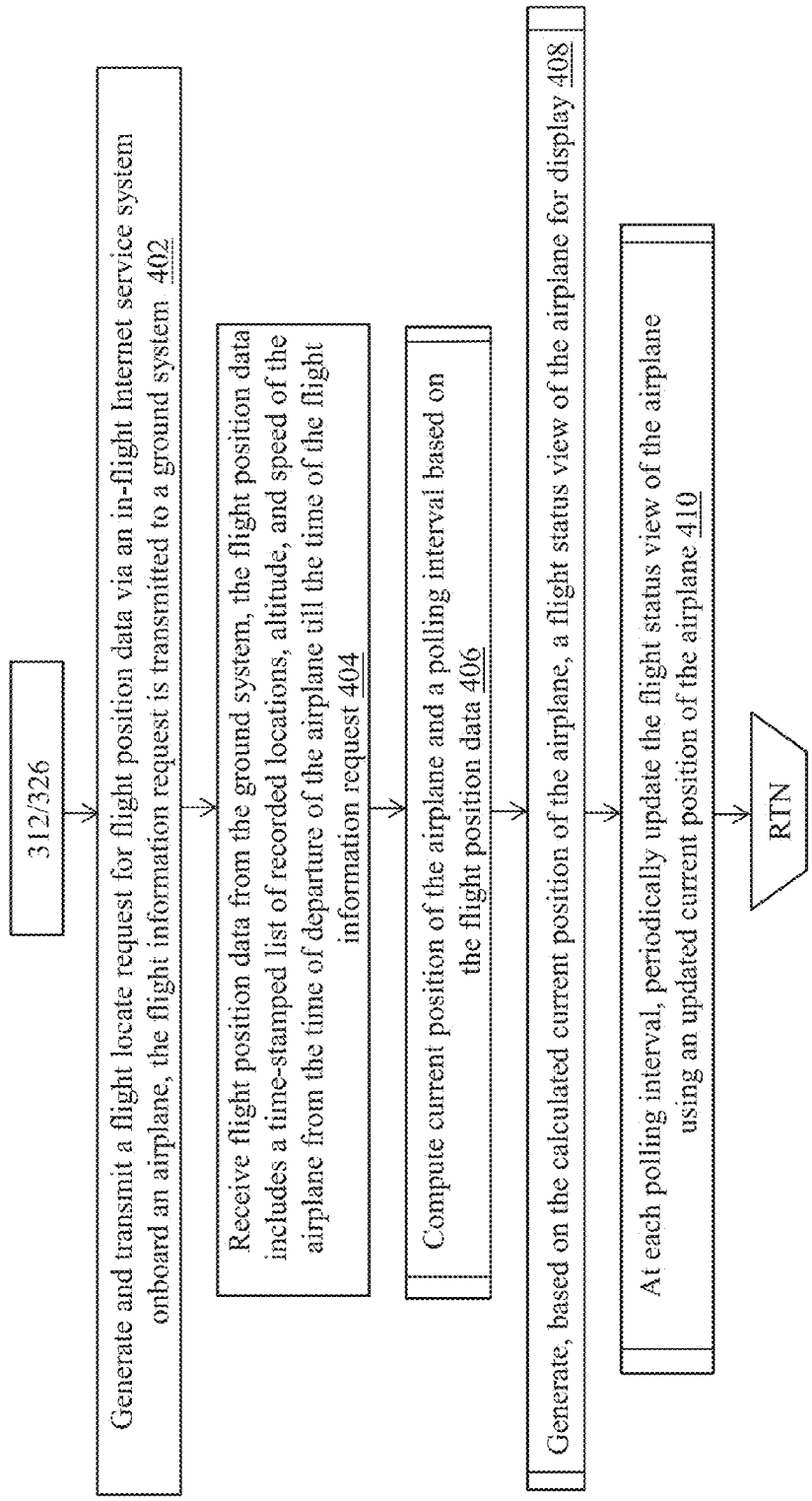
FIG. 4 is a flowchart that illustrates an example method of generating and presenting the interactive flight status display based on data received via an in-flight Internet service system in accordance with an example embodiment.

Operations 312 and 326 associated with a generation and presentation of the interactive flight status display based on data received over the Internet 110 via the in-flight Internet service system 104 may be described in greater detail in association with FIG. 4. Similarly, the operations 314 and 324 associated with a generation and presentation of the interactive flight status display based on data received over the Internet 110 via the ground Internet service system 104 may be described in greater detail in association with FIG. 7.

Turning to FIG. 4, this figure is a flowchart that illustrates an example method of generating and presenting the interactive flight status display based on data received via an in-flight Internet service system in accordance with an example embodiment. In operation 402, the request generation engine 202 may generate a flight locate request for the airplane 102. The flight locate request includes at least a flight identifier to identify the airplane 102. In some embodiments, the flight locate request may also include an instruction indicating the type of data that should be returned in response to the flight locate request, an identifier that indicates if the flight locate request is an initial flight locate request or a subsequent flight locate request, and/or a time stamp indicating the time the flight locate request is generated. Further, in operation 402, the request generation engine 202 operates in conjunction with the data communication engine of the personal computing device 106 to transmit the flight locate request to a ground system 112, i.e., flight status server 120. The flight locate request may be transmitted over the Internet 110 via the in-flight Internet service system 104.

Responsive to receiving the flight locate request, the flight status server 120 may retrieve flight position data associated with the airplane 102 based on the flight identifier, the data instruction, and/or the initial request indicator. In some embodiments, the flight locate request may not include the data instruction and/or the initial request indicator, in which case, the flight status server 120 may be configured to identify an initial flight locate request based on a time of arrival of the flight locate request and a search for previous flight locate requests from a departure time of the airplane. In either case, once the flight position data is retrieved, the flight status server 120 transmits the flight position data to the personal computing device 106 over the Internet 110.

In operation 404, the input/output engine 238 of the personal computing device 106 may receive and store the flight position data in a memory 220 of the personal computing device 106. The flight position data may be received over the Internet 110 via the in-flight Internet service system 104. The flight position data may include a list of recorded locations, altitudes, and speeds of the airplane 102 from a time of departure of the airplane till a time of the flight locate request. For example, if a departure time of the flight is 9:10 am and the time at which the flight locate request is generated is 10:00 am, the flight position data may include a list of locations, altitudes, and speeds of the airplane 102 that have been recorded between 9:10 am and 10:00 am. Further, the flight position data also includes a timestamp associated with each recorded location, altitude, and speed of the airplane 102. The timestamp indicates a time at which each of the locations, altitudes, and speeds in the list were recorded. Further, in operation 404, the input/output engine 238 forwards the flight position data to the position engine 204 and the polling engine 206.

Responsive to receiving the flight position data, in operation 406, the position engine 204 may compute the current position of the airplane, and the polling engine 206 may compute the polling interval that is associated with an update operation (e.g., updating the current position). In one embodiment, the current position of the airplane may be computed using the list of recorded locations included in the flight position data. In another embodiment, the current position may be calculated using other data, such as a planned path, an elapsed in-flight time along the planned path, and/or a remaining flight time along the planned path. Operation 406 will be described below in greater detail in association with FIG. 10.

Figure 10:
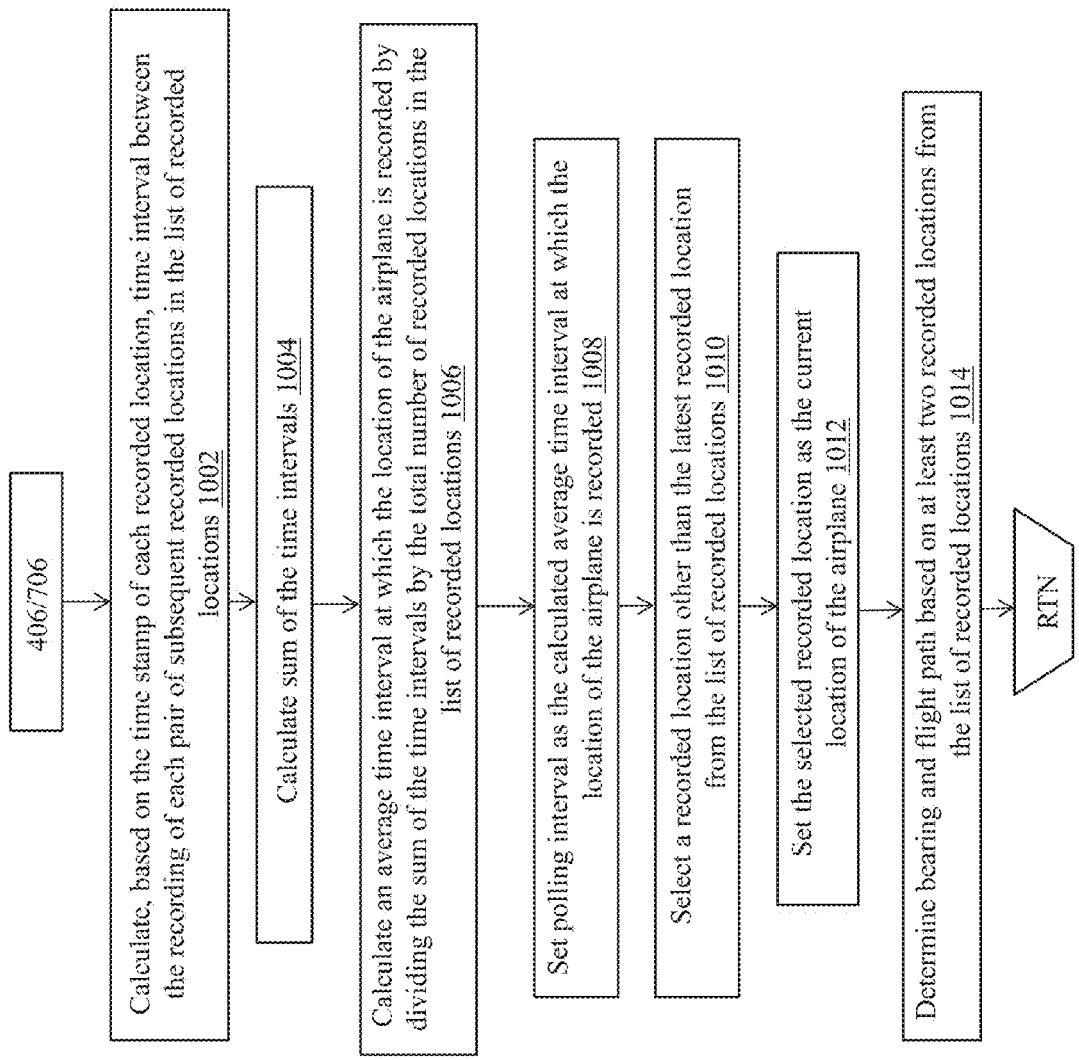
FIG. 10 is a flowchart that illustrates an example method of calculating a current position of the airplane and polling interval in accordance with an example embodiment.

Turning to FIG. 10, this figure is a flowchart that illustrates an example method of calculating a current position of the airplane and polling interval in accordance with an example embodiment. In operation 1002, the position engine 204 may operate in conjunction with the processor of the personal computing device 106 to calculate a time difference between the recording of each subsequent data elements pair in the list of recorded locations, altitudes, and speeds of the airplane 102. Then, in operation 1004, the position engine 204 may calculate a sum of the time differences. Further, in operation 1006, the position engine may calculate an average time difference by dividing the sum of the time differences calculated in operation 1004 with a total number of subsequent data pairs in the list of recorded locations, altitudes, and speeds of the airplane 102. Responsive to calculating the average time difference, in operation 1008, the position engine 204 may operate in concert with the polling engine 206 to set the average time difference calculated in operation 1006 as the polling interval.

Once the polling interval is set, in operation 1010, the position engine 204 may select a recorded location from the list of recorded locations other than the latest recorded location. Then, in operation 1012, the selected location may be set as the current location of the airplane 102. Further, in operation 1014, the position engine 204 may determine a current direction of the airplane based on the current location of the airplane 102 and the latest recorded location of the airplane. Furthermore, in operation 1014, the position engine 204 may determine the flight path of the airplane 102 based on the list of recorded locations of the airplane 102. One of ordinary skill in the art can understand and appreciate that the position engine 204 may use any appropriate mathematical and/geometric calculation/models/methods to determine the current location, direction, and flight path of the airplane 102 without departing from a broader scope of this disclosure.

In one example, the flight position data may be represented as 'X'. Assuming that the departure time of the airplane 102 is 10:00 am and the time of the flight locate request is 10:30 am, the flight position data X may include a list of recorded locations of the airplane from 10:00 am to 10:30 am. The list of recorded locations of the airplane 102 may be represented as 'x(1), x(2), . . . , x(n−2), x (n−1), x(n),' where x(1) represents the first recorded location and x(n) represents the latest recorded location. Further, a time of recording (time stamp) may be represented as 'T_x(1), . . . , T_x(n),' where T_x(1) is the time associated with the recording of location x(1) and T_x(n) is the time associated with the recording of location x(n). Assuming that five recorded locations represented by x(1), x(2), x(3), x(4), and x(5) are recorded between 10.00 am and 10:30 am, in operation 1002, the position engine 202 may calculate a time difference between the time of recording of subsequent location pairs, i.e., [T_x(1), T_x(2)], [T_x(2), T_x(3)], [T_x(3), T_x(4)], and [T_x(4), T_x(5)]. Further, the position engine 204 calculates a sum of the time differences and divides it by the total number of location pairs. The result of the division may provide an average time difference between subsequent recordings of the location of the airplane 102. The average time difference is then set as the polling interval. The polling interval may be mathematically expressed as follows:

$$\text{Polling Interval} = \frac{\sum_{i=1}^{n-1} T_{x(i+1)} - T_{x(i)}}{n-1} \quad (1)$$

In Equation 1, 'n' represents the number of recorded data elements, x(n) represents the latest recorded data element, and x(1) represents the first recorded data element. The average time interval may indicate how often the location, altitude, and/or speed of the airplane 102 are recorded. In the above mentioned example, if the average time interval between the recording of subsequent locations is two minutes, then the polling interval is set as two minutes. The polling interval may determine a rate at which the current position of the airplane 102 and/or the interactive flight status display is updated.

In said example, once the polling interval is calculated, the position engine 204 selects a recorded location from other than the latest recorded location from the list of recorded locations (x(1), x(2), . . . , x(n−2), x (n−1), x(n),). In other words, the position engine 204 selects any recorded location from x(1) to x(n−1) and sets the selected location as the current location of the airplane 102. For example, the position engine 204 may select a location x(n−1) or a location x(n−2), and set the selected location as the current location of the airplane 102.

Further, using the latest recorded location x(n) and the current location of the airplane 102 (e.g., x(n−1), x(n−2), etc.), the position engine 204 determines the direction of the airplane. For example, if the current location of the airplane, i.e., x(n−1) is (X, Y) and the latest recorded location of the airplane 102, i.e., x(n) is (X+1, Y+1), then, the position engine 204 may determine that the airplane 102 is heading in a north-east direction, provide locations (X,Y) and (X+1, Y+1) were locations on a Cartesian coordinate plane. One of ordinary skill in the art can understand and appreciate that the Cartesian coordinate values used in the above example is for explanatory purposes and are not limiting. In other words, in reality, the location of an airplane 102 may be represented by geometric coordinates (e.g., latitude and longitude values) and not Cartesian coordinates.

The process of selecting and setting a recorded location other than the latest recorded location as the current location of the airplane 102 allows the application engine 101 to provide a more accurate location and direction of the airplane. On the contrary, if the latest recorded location, i.e., x(n) is set as the current location of the airplane 102, the position engine 204 will have to estimate or guess the direction of the airplane 102, which may result in errors. Accordingly, selecting and setting a recorded location other than the latest recorded location as the current location of the airplane 102 provides accuracy and removes any ambiguity.

Once the current location, direction, flight path, and/or polling interval are calculated, the position engine 204 returns to operation 408 illustrated in FIG. 4. Turning back to FIG. 4, in operation 408, the application engine 101 is configured to generate a flight status view 1400a/1400b (shown in FIGS. 14A and 14B) for presentation to a user (108, 118) via an output medium of the personal computing device 106. Operation 408 is described below in greater detail in association with FIG. 5.

Figure 5A:
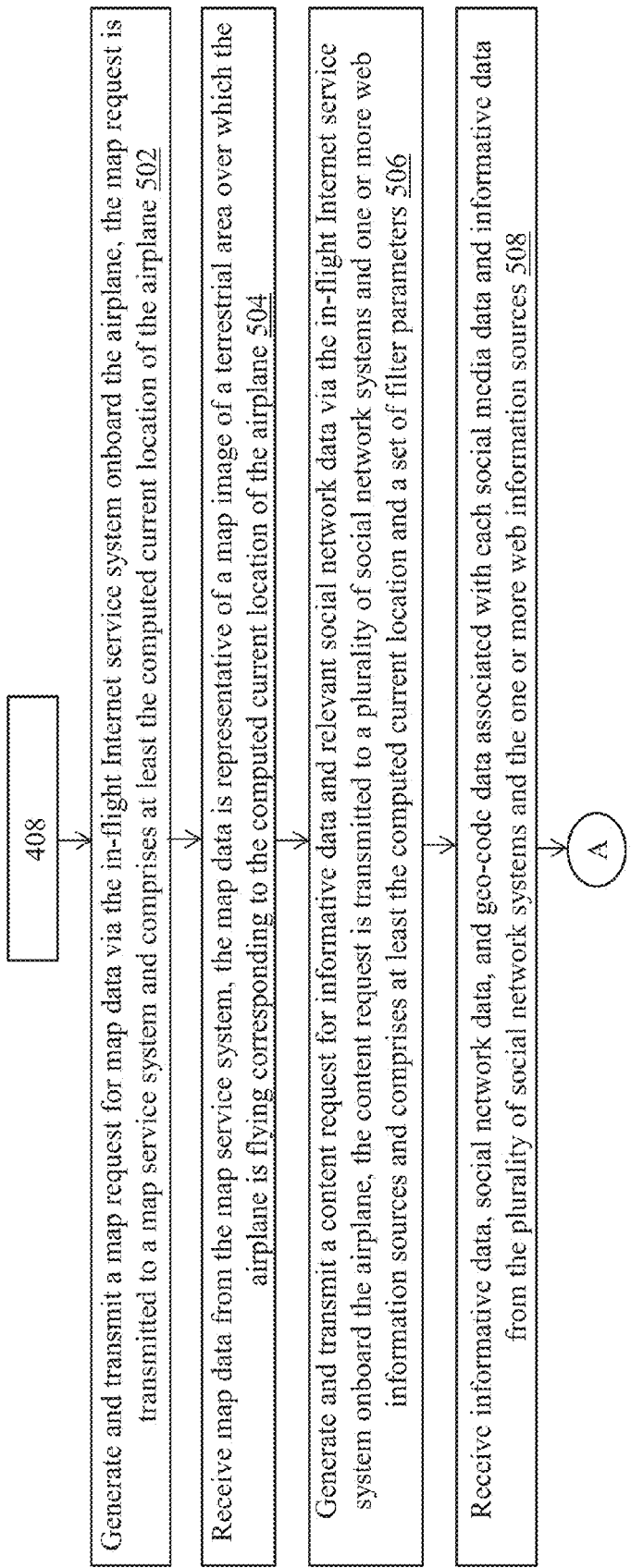
FIGS. 5A and 5B (collectively 'FIG. 5') are flowcharts that illustrate an example method associated with the generation of the flight status view based on data received via an in-flight Internet service system in accordance with an example embodiment.
Figure 5B:
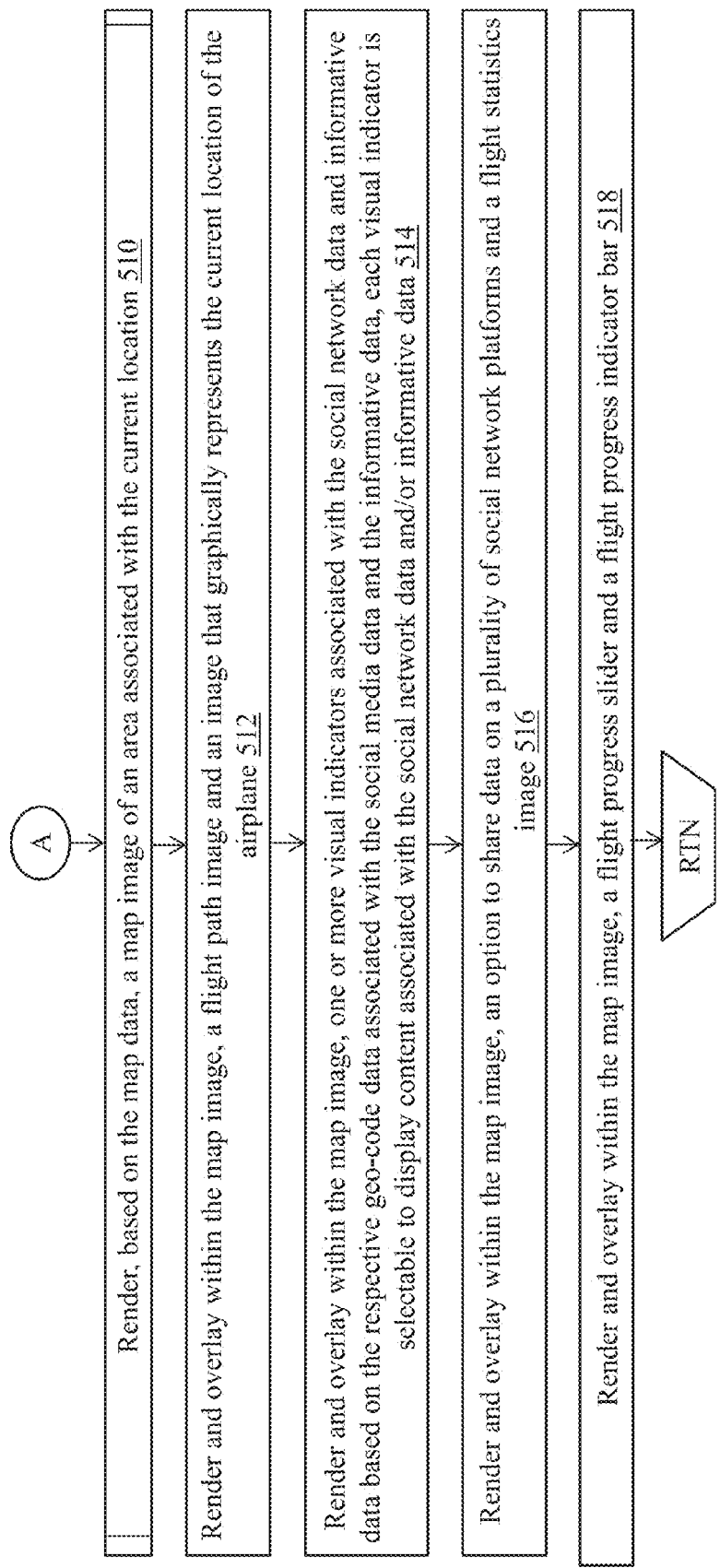

Turning to FIG. 5, this figure is a flowchart that illustrates an example method associated with the generation of the flight status view based on data received via an in-flight Internet service system in accordance with an example embodiment. In operation 502, the map display engine 212 may operate in concert with the request generation engine 202 to generate a map request and transmit the map request to a map service system 122 on the ground. As described above in association with FIG. 2, the map request may include at least the calculated current location of the airplane 102, the altitude of the airplane, form factor or the personal computing device, and/or zoom parameters. However, one of ordinary skill in the art can understand and appreciate that the map request can include any additional appropriate parameters that assist with rendering a map image without departing from a broader scope of this disclosure.

Responsive to receiving the map request, the map service system 122 may retrieve and transmit map data to the personal computing device 106 via the Internet. In operation 504, the input/output engine 238 of the personal computing device 106 may receive and/or store the map data in a memory 220 of the personal computing device 106.

In operation 506, the social network services engine 216 and/or the content retrieval engine 218 may operate in concert with the request generation engine 202 to generate a content request and transmit the content request to the social network service system 124 and/or the one or more information sources 126 on the ground. In particular, the social network services engine 216 and/or the content retrieval engine 218 may generate separate content requests. The content request generated by the social network services engine 216 may be transmitted to the social network services engine 124 on the ground, and the content request generated by the content retrieval engine 218 may be transmitted to the one or more information sources 126 on the ground. As described above in association with FIG. 2, the content request generated by the social network services engine 216 and/or the content retrieval engine 218 may include at least the calculated current location of the airplane 102 and a set of filter parameters. The set of filter parameters may include at least a limit on the number of data elements that are to be returned in response to the content request and/or a distance limit. However, one of ordinary skill in the art can understand and appreciate that the content request generated by the social network services engine 216 and/or the content retrieval engine 218 can include any other appropriate parameters without departing from a broader scope of this disclosure.

In one example embodiment, the user (108, 118) has to be logged into the user's social network account for receiving social network features in the interactive flight status display. For example, to receive features associated with Facebook®, the user has to be logged into his/her Facebook account. Accordingly, in addition to the current location of the airplane and the set of filter parameters, the content request generated by the social network services engine 216 may include user credentials associated with the user's social network account. In said example embodiment, if the user is not logged into the user's social network account, the application engine 101 may prompt the user to log into the user's social network account.

Responsive to receiving the content request, the social network services system 124 and the one or more information sources 126 may transmit social network data and informative data to the personal computing device 106, respectively. In operation 508, the input the input/output engine 238 of the personal computing device 106 may receive and/or store the social network data and the informative data in a memory 220 of the personal computing device 106. As described above in association in FIG. 2, the social network data and/or informative data may include one or more data elements based on the data limit included in the content request. In one example, each data element of the social network data and/or the informative data may include a header and body. The header may include a title or a metadata identifying the content represented by the data element, and the body of the data element may include at a portion of the content, a hyperlink to the content, and/or geographic coordinates associated with each data element.

In one example embodiment, the informative data that is received in response to the content request may vary based on whether the user (108, 118) is logged in as a member or as a guest. If the user (108, 118) is logged in as a guest, the informative data may include generally available information, such as information about landmarks, points of interest, and so on (e.g., information from Wikipedia®, Panoramio®, Google®, etc.,). On the contrary, if the user is logged in as a member, the application engine 101 retrieves a member profile of the user and determine additional information associated with the user (108, 118), such as user's likes and dislikes, user's preferences, locations to which the user has traveled in the past, events that the user has attended, loyalty points accrued by the user, user's hobbies, and so on. Further, using the additional information associated with the user (108, 118), the informative data may be customized and personalized to the user (108, 118). Accordingly, in addition to the current location of the airplane and the set of filter parameters, the content request generated by the content retrieval engine 218 may include an identifier that indicates if the user (108, 118) is logged in as a member or a guest and/or user credentials associated with the user's member status, and additional user information if the user is a member.

In one example, if a user is logged in a Delta SkyMiles member, the informative data returned by the one or more information sources 126 may include, but is not limited to, Delta SkyMiles Dining locations (locations of restaurants at the destination that participate in the SkyMiles program), Delta Partner benefits information (car, hotel, vacation miles earning opportunities at the destination), sports and lifestyle information (content that is personally relevant from SkyMiles partnership offers available at relevant destinations for the customer trip, e.g., Broadway shows, Chelsea® football club events at destination, 'Uber' like opportunity for ground transportation or event at the destination for anyone who is traveling on a Delta flight, and so on. Additionally, the generally available information may also be made available to the user (108, 118) that is logged in as a member.

Figure 14A:
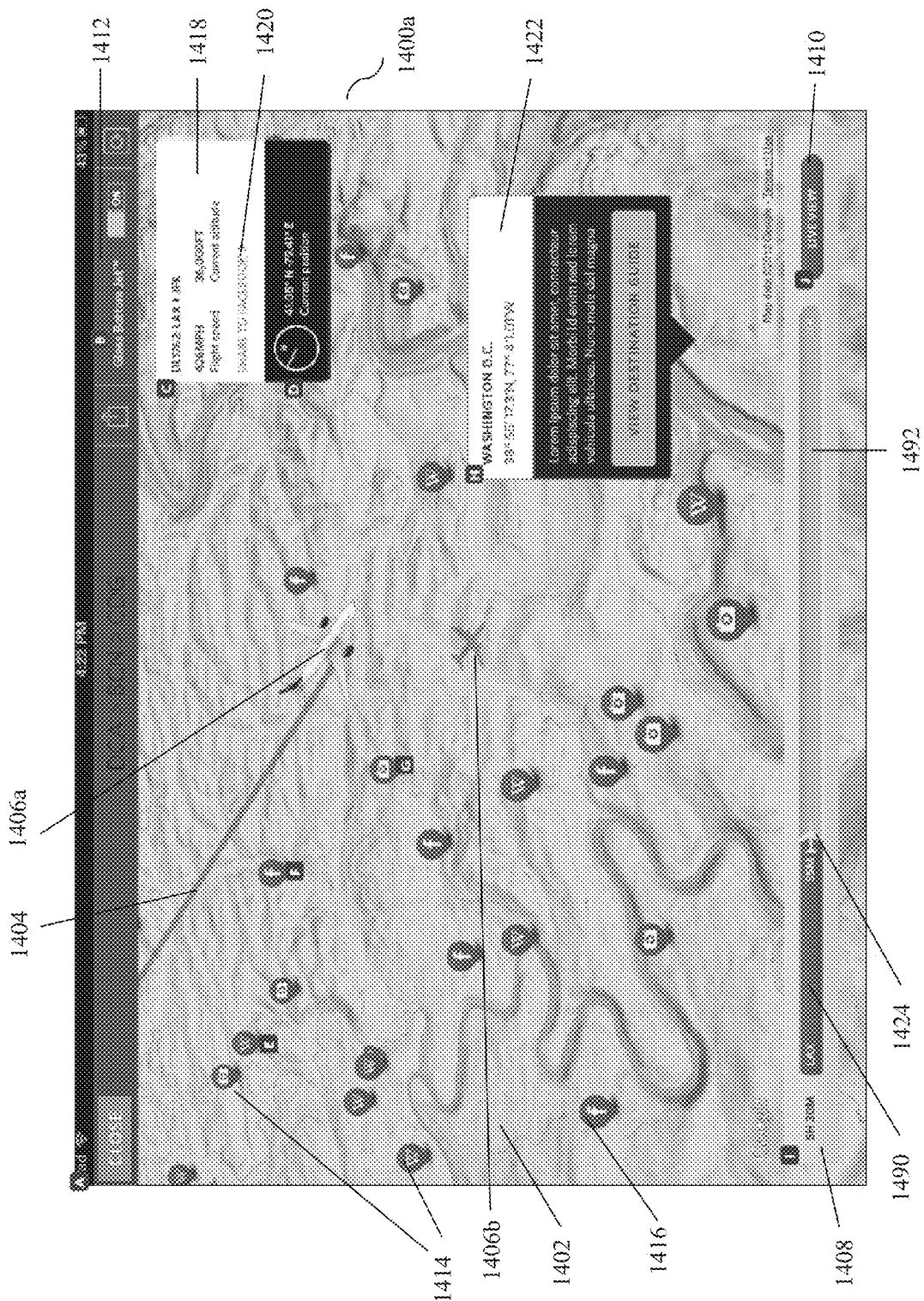
FIGS. 14A-14E (collectively 'FIG. 14') illustrate example flight status views presented to a user in accordance with an example embodiment.
Figure 14B:
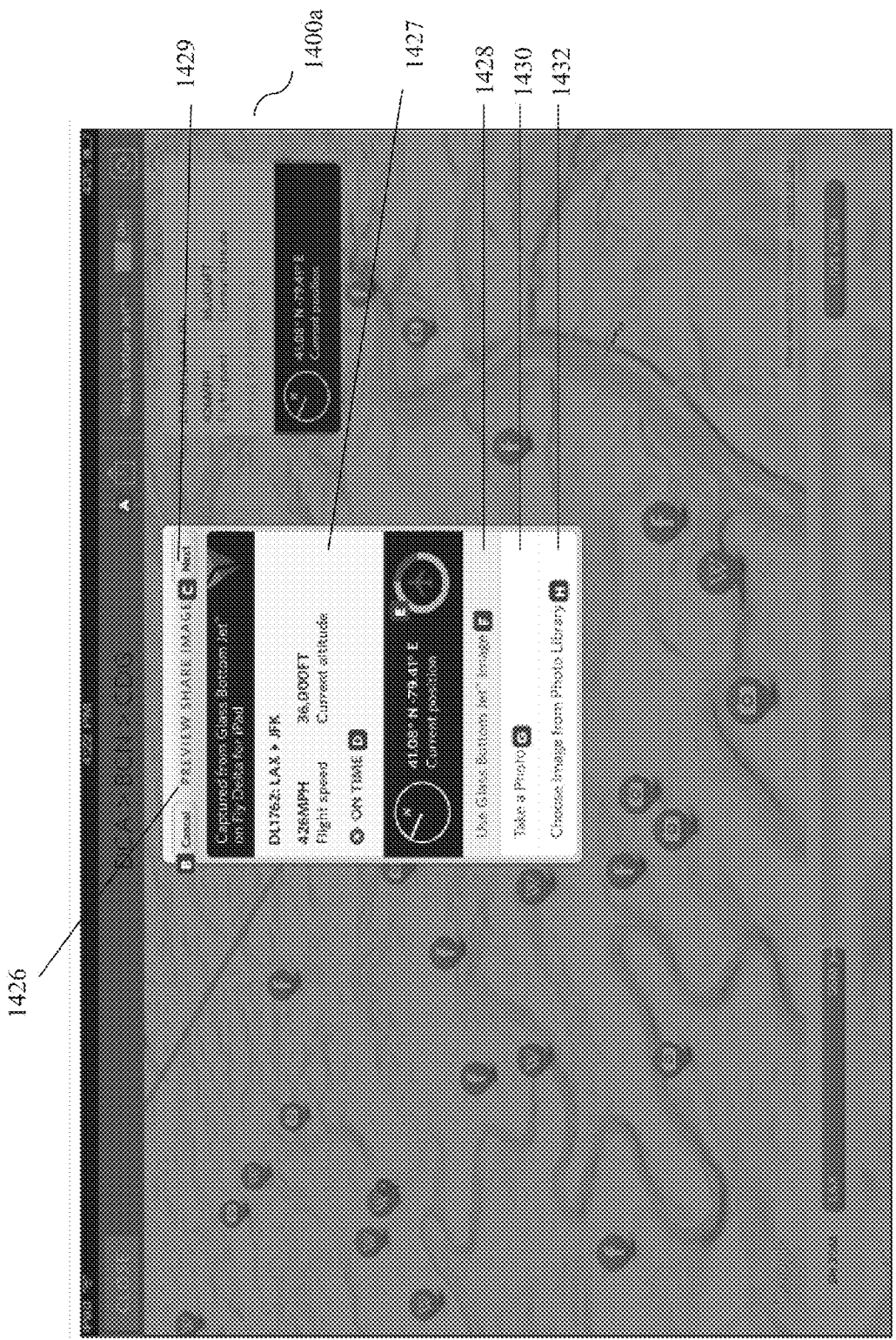

In operation 510, the application engine 101 forwards the received map data to the graphics rendering engine 230. Upon receiving the map data, in operation 510, the graphics rendering engine may render a map image of the terrestrial area over which the airplane is flying corresponding to its current position. FIGS. 14A and 14D illustrate an example map image 1402 rendered by the graphics rendering image 230. Operation 510 is described in greater detail in association with FIG. 11.

Figure 11:
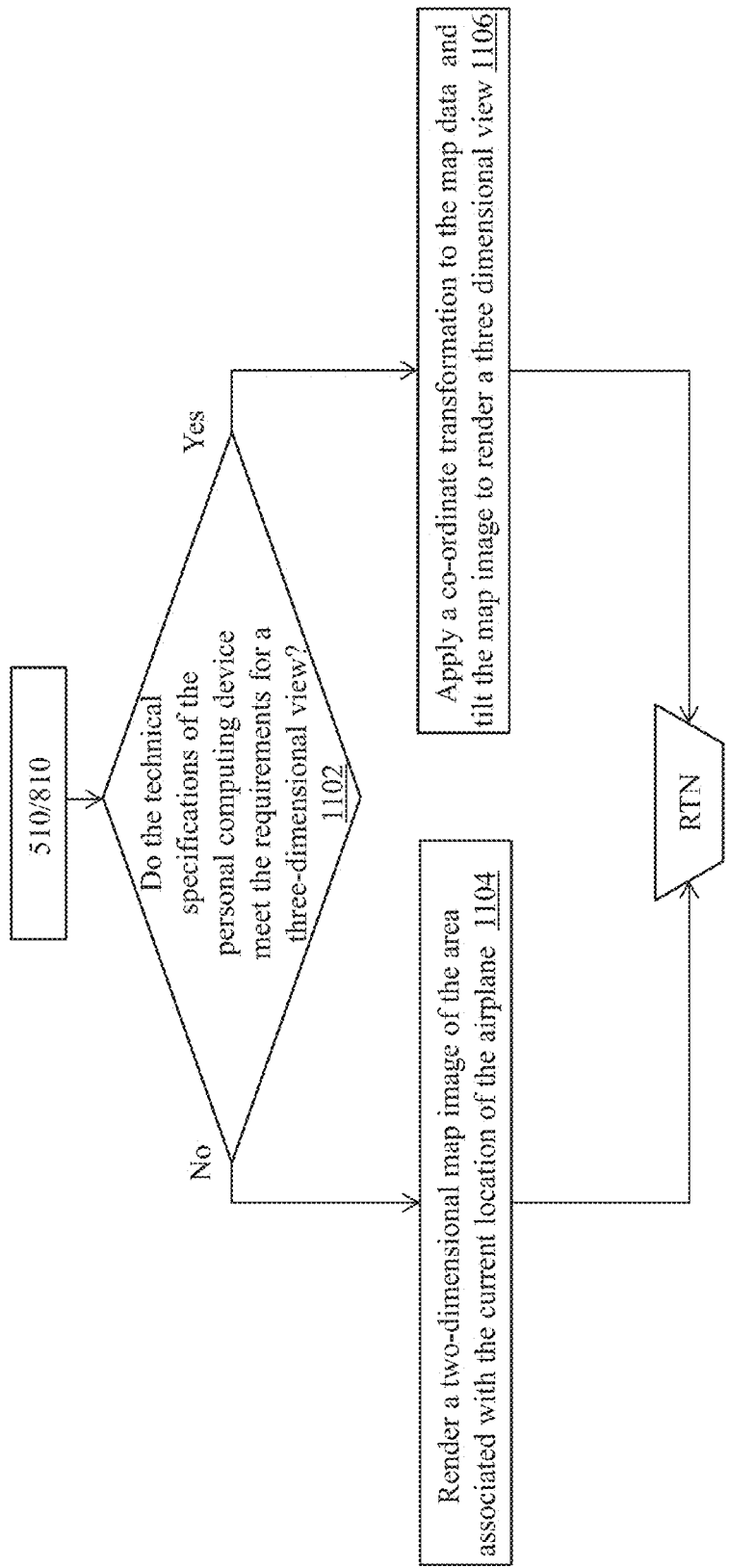
FIG. 11 is a flowchart that illustrates an example method of rendering a map view for the interactive flight status display in accordance with an example embodiment.

Turning to FIG. 11, this figure is a flowchart that illustrates an example method of rendering a map view for the interactive flight status display in accordance with an example embodiment. In operation 1102, the user device and network determination engine 232 determines if the technical specifications of the personal computing device 106 meets one or more requirements for rendering a three-dimensional image. If the technical specifications meet the one or more requirements, in operation 1106, the graphics rendering engine 230 may operate in concert with the processor 222 of the personal computing device to apply a coordinate transformation to the received map data for tilting the map image in order to provide a three-dimensional effect to the map image. The coordinate transformation may be applied along one or more of the x, y, and z coordinate. One of ordinary skill in the art can understand and appreciate that any other appropriate methods may also be used to generate a three dimensional image. In some embodiments, when network bandwidth is not scarce, the received map data may include a three dimensional map image that need not be subject to transformations. However, if the technical specifications meet the one or more requirements, in operation 1104, the graphics rendering engine 230 may render a two-dimensional map image. Once the tilted map image or the two dimensional map image is rendered, the graphics rendering engine 230 returns to operation 512 of FIG. 5.

Returning to FIG. 5, in operation 512, the graphics rendering engine 230 may receive the flight position data and the current position of the airplane. Responsively, the graphics rendering engine 230 may communicate with the flight path engine 208 to determine a flight path of the airplane based on the flight position data. Once the flight path data is determined, in operation 512, the graphics rendering engine 230 may render an image of a flight path, e.g., flight path 1404 illustrated in FIGS. 14A and 14D. The image of the flight path may include a geometric figure, such as a line or a curve that passes through one or more of the recorded locations of the airplane 102. In addition to rendering the flight path image 1404, the graphics rendering engine 230 may render an image representative of an airplane and an image representative of a shadow of the airplane, e.g., airplane image 1406a and shadow image 1406b. The image of the airplane 1406a may be located within the map image 1402 at a point that corresponds to the current location of the airplane 102 in the air. Further, the image of the shadow of the airplane 1406b may be located within the map image 1402 at a point that corresponds to a terrestrial location associated with the current location of the airplane 102. One of ordinary skill in the art can understand and appreciate that the airplane image 1406a illustrated in FIGS. 14A and 14D is not limiting, and any other appropriate image can be used to represent a current position of the airplane without departing from a broader scope of this description. In an example embodiment, the graphics rendering engine 230 may be configured to overlay the flight path image 1404, the airplane image 1406a, and the shadow image 1406b on top of the map image 1402 as illustrated in FIGS. 14A and 14D.

Further, in operation 514, the graphics rendering engine 230 may receive social network data and informative data. Responsively, the graphics rendering engine 230 may communicate with the visual indicator engine 224 to render a visual indicator image for each data element of the social network data and informative data. In an example embodiment, each data element of the social network data and informative data may be categorized based on a source of the data element. Further, data elements of different groups may be assigned different visual indictor images to distinguish between data elements of different groups. In other words, all data elements of one group may be assigned one type of visual indicator image, while all data elements of another group may be assigned another type of visual indicator image. In some embodiments, the visual indicator images may be designed such that a user can recognize the source of the data element based on the visual identifier image. For example, each data element associated with Facebook® may be assigned a visual identifier image that includes a Facebook® logo, while each data element associated with Wikipedia® may be assigned a visual identifier image that includes a Wikipedia® logo, as illustrated in FIGS. 14A and 14D. In particular, FIGS. 14A and 14D illustrate a Facebook® visual indicator 1416 (visual indicator representing social network data) and a Wikipedia®/Panoramio® visual indicator 1414 (visual indicator representing informative data). However, one of ordinary skill in the art can understand and appreciate that any other type or form of visual indicators may be used without departing from a broader scope of this disclosure. For example, element 1422 illustrated in FIGS. 14A and 14D is another example visual indicator that represents proprietary information, such location information curated and customized by a private party (e.g., curated by Delta from Delta specific magazines, articles, and so on).

In one example embodiment, each data element of the social network data and the informative data may include a geographic coordinate associated data element. Accordingly, the graphics rendering engine 230 may be locate each visual indicator image at a point on the map image that corresponds to the geographic coordinate of data element represented by the visual indicator image, as illustrated by elements 1416 and 1414 in FIGS. 14A and 14D. Further, each visual indicator image may be made selectable. A user (108, 118) may select a visual indicator using an input member of the personal computing device 106, such as by touch, a mouse, stylus, etc. In one example embodiment, when the user selects a visual indicator, the user (108, 118) may be transferred to a website that includes content associated with the data represented by the selected visual indicator. Alternatively, in another example embodiment, when the user selects a visual indicator, the user (108, 118) may be presented with a pop-up window that includes content associated with the data represented by the selected visual indicator, as illustrated by elements 1446, 1444, 1456, 1454 in FIG. 14E. The pop-up window may or may not be presented within the flight status view 1400a/1400b. In some embodiments, the content may be customized for the interactive flight status display based on information associated with the user (108, 118), a display form factor of the personal computing device 106, and so on. In particular, FIG. 14E illustrates example pop-up windows, such pop-up window with Facebook® related content 1446, a pop-up window with Wikipedia® related content 1444, a pop-up window with Twitter® related content 1456, and a pop-up window with Panoramio® related content 1454.

In operation 516, the graphics rendering engine 230 may communicate with the flights statistics engine 214 to render an image that represents flights statistics information using flight position data, and the current airplane position data, e.g., flight statistics image 1418 of FIG. 14A. As illustrated in FIG. 14A, the flight statistics image 1418 may textually present at least a current location of the airplane 102, a direction (bearing) of the airplane 102, a flight number, and/or a departure/arrival location pair. In addition to the flight statistics image, in operation 516, the graphics rendering engine 230 may render a selectable image that provides a user with an option to post and/or share information on one or more social network platforms, e.g., Facebook® share option 1420 as illustrated in FIG. 14A.

Further, in operation 518, the graphics rendering engine 230 may operate in concert with the progress slider engine 226 to generate an image of a progress indicator bar with a slider as illustrated by elements 1408, 1410, and 1428 of FIGS. 14A and 14D. In particular, a highlighted portion 1090 of the progress indicator bar 1408 may indicate a percentage of travel that has been completed by the airplane 102. Further, as illustrated in FIGS. 14A and 14D, the progress indicator bar 1408 may indicate a total estimated travel time of the airplane for a travel between the departure and arrival locations. The progress indicator bar 1408 may also indicate an elapsed time from a time of departure of the airplane 102. Furthermore, the progress indicator bar 1408 may include an option 1410 for the user (108, 118) to switch back to a traditional flight tracking view.

In one example embodiment, the graphics rendering engine 230 may be configured to appropriately stack two or more of the rendered images to present one comprehensive image, e.g., comprehensive flight status view 1400a/1400b to the user (108, 118) as illustrated in FIGS. 14A and 14D. In another example embodiment, the graphics rendering engine 230 may be configured to present each image in separate windows as different components. Further, one of ordinary skill in the art can understand appreciate that the flight status view described above is an example flights status view and is not limiting. That is, some of the rendered images may be omitted from the flight status view or any additional images representing any other appropriate data may be rendered and added to the flight status view without departing from a broader scope of this disclosure.

Once the flight status view is generated, the application engine 101 may return to operation 410 of FIG. 4. Turning back to FIG. 4, in operation 410, the polling engine 206 may be configured to periodically update the flight status view 1400a/1400b of the airplane 102 based on an updated current position of the airplane 102. The rate at which the flight status view 1400a/1400b of the airplane 102 is updated may depend on the polling interval. Operation 410 is described in greater detail in association with FIG. 6.

Figure 6:
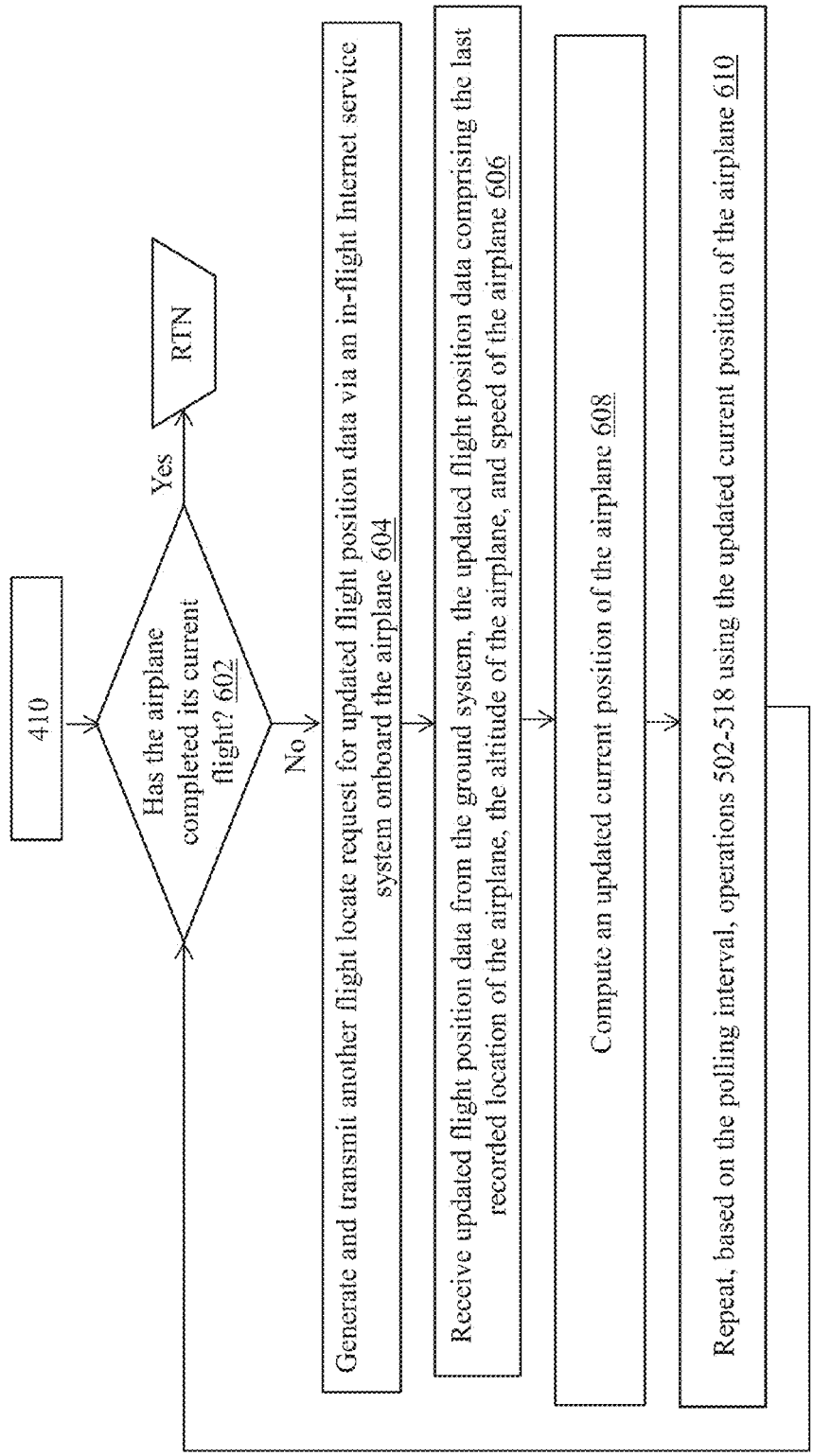
FIG. 6 is a flowchart that illustrates a process of updating the flight status view that generated based on data received via an in-flight Internet service system in accordance with an example embodiment in accordance with an example embodiment.

Turning to FIG. 6, this figure is a flowchart that illustrates a process of updating the flight status view in accordance with an example embodiment. In operation 602, at each polling interval, polling engine 206 may check if the airplane 102 has completed its current flight. However, in operation 602, if the polling engine 206 determines that the airplane 102 has not completed its current flight, the polling engine 206 proceeds to operation 604, where the polling engine 206 operates in concert with the request generation engine 202 to generate a subsequent flight locate request. Further, in operation 604, the subsequent flight locate request may be transmitted to the flight status server 120 over the Internet 110 via the in-flight Internet service system 104. Responsive to transmitting the subsequent flight locate request, in operation 606, the personal computing device 106 may receive and store an updated flight position data in the memory 220 of the personal computing device 106. As described above in association with FIG. 2, the updated flight position data may include only the last recorded location, altitude, and/or speed of the airplane 102 instead of a list of recorded locations, altitudes, and/or speeds received in response to an initial flight locate request.

After receiving and storing the updated flight position data, in operation 608, the position engine 204 may calculate an updated current position of the airplane 102. In particular, the position engine 204 may retrieve a list of recorded locations that stored in the memory 220 (including the last recorded location associated with the updated flight position data). Further, the position engine 204 may scan the list of recorded locations that stored in the memory 220 to identify a location that is recorded subsequent to the recording of the location that is set as the current location of the airplane 102. The location may be identified based on the timestamp associated with the location. Responsive to identifying a location that is recorded subsequent to the recording of the location that is set as the current location of the airplane 102, the position engine 204 may set the identified location as the updated current location of the airplane 102. Furthermore, based on the updated current location and the last recorded location of the airplane 102, the position engine 204 may calculate an updated current direction of the airplane 102 and the updated flight path of the airplane 102.

Responsive to calculating the updated current position of the airplane 102, in operation 610, the application engine 101 may repeat operations 502-518 or FIG. 5 using the updated current position of the airplane 102 to generate an update flight status view that reflects the updated current position of the airplane 102. Once the updated flight status view is generated, the application engine 101 returns to operation 602 where the polling engine continues to check if the airplane 102 has completed its current flight. In other words, the flight status view is periodically updated till the airplane 102 completes its current flight. However, one of ordinary skill in the art can understand and appreciate that the condition of the airplane completing its current flight may be replaced by any other appropriate conditions without departing from a broader scope of this disclosure. For example, the operation of periodically updating the flight status view may be terminated upon reaching a pre-determined time interval from the time of departure of the airplane. In another example, the operation of periodically updating the flight status view may be terminated upon reaching a pre-determined time interval from an estimated time of arrival of the airplane (e.g., prior to landing). In yet another example, the operation of periodically updating the flight status view may be terminated when the airplane 102 reaches a pre-determined location.

Returning to operation 602, if the airplane 102 has completed its current flight, the application engine returns to operation 412 of FIG. 4, the interactive flight status display is terminated and the process ends.

In one example, an airplane B records its location at 9:58 am as (X,Y), and at 10:00 am as (X+1, Y+1). These locations may be recorded by the onboard tracking system 107 and transmitted to the flight status server 120. Accordingly, the above mentioned locations and the time of their recording may be stored in the flight status server 120. In said example, an application engine 101 residing in a personal computing device 106 may be located onboard airplane B. At 10:01 am, the application engine 101 may generate and transmit an initial flight locate request to the flight status server 120.

Responsive to receiving the initial flight locate request, the flight status server 120 may return flight position data to the application engine 101. The flight position data may include two data points (elements): 1) Location (X,Y)—9:58 am, and 2) Location (X+1,Y+1)—10:00 am. Upon receiving the flight position data, the application engine 101 may set the current location as a location other than the latest recorded location. The last recorded location in the flight position data is location (X+1,Y+1) recorded at 10:00 am. Accordingly, the application engine 101 sets the current location as location (X,Y) recorded at 9:58 am. In addition, the polling interval may be calculated based on the average time difference between subsequent recordings of the airplane's locations/positions. Accordingly, in said example the polling interval is 2 minutes.

The application engine 101 may cache (store) the polling interval and flight position data, i.e., location (X,Y) recorded at 9:58 am, and location (X+1,Y+1) recorded at 10:00 am in the memory 220 of the personal computing device 106. Once the current position of the airplane 102 and the polling interval is determined, the application engine 101 generates and displays a flight status view using the personal computing device 106.

Continuing with the example, once the flight status view is generated, at each polling interval, i.e., every 2 minutes from the generation of the last flight locate request, the polling engine 206 may check if airplane B has completed its flight. In said example, at 10:03 am which is 2 minutes past the last flight locate request at 10:01 am, the polling engine 206 may check if airplane B has completed its flight. Assuming that airplane B has not completed its flight, the polling engine 206 operates in concert with the request generation engine 202 to generate a subsequent flight locate request at 10:03 am.

In the meantime, the onboard tracking system 107 of airplane B may have recorded and transmitted another location of the airplane B at 10:02 am to the flight status server 120, provided that the average time difference between each recording is 2 minutes. Accordingly, in response to the flight locate request at 10:03 am, the flight status server 120 may transmit the last recorded location prior to the time of the subsequent flight locate request at 10:03 am. At 10:03 am, the last recorded location available at the flight status server 102 is the location recorded at 10:02 am. In said example, the location recorded at 10:02 am is (X+2,Y+2). The last recorded location may be transmitted to the personal computing device 106 as an updated flight position data. The personal computing device 106 stored the updated flight position data in the memory 220. Accordingly, at 10:03 am, the memory 220 of the personal computing device 106 may include three recorded locations, i.e., location (X,Y) recorded at 9:58 am, location (X+1,Y+1) recorded at 10:00 am, and location (X+2,Y+2) recorded at 10:02 am.

Continuing with the example, after receiving the updated flight position data, the application engine 101 may calculate the airplane B's updated current position. To calculate the updated current location, the application engine determines a timestamp associated with the location that is set as the current location, i.e., location (X,Y). The time stamp indicates that the location (X,Y) that is presently set as the current location is 9:58 am. Then, the application engine 101 scans through the list of recorded locations stored in the memory 220, i.e., location (X,Y) recorded at 9:58 am, location (X+1,Y+1) recorded at 10:00 am, and location (X+2,Y+2) recorded at 10:02 am. Responsive to scanning, the application engine 101 identifies a location that is recorded subsequent to the recording of the location (X,Y) that is presently set as the current location. The location the is recorded subsequent to the recording of location (X,Y) is location (X+1,Y+1) that was recorded at 10:00 am. The identified location, i.e., location (X+1,Y+1) is set as the updated current location despite of having a more recent recorded location, i.e., location (X+2,Y+2) recorded at 10:02 am. This increases the accuracy of the airplane positions displayed by the application engine 101 because, at any given time, the application engine 101 knows at least one next location of the airplane that follows the current location/updated current location of the airplane. Once the updated current location and direction of airplane B is determined, the application engine repeats the step of generating the flight status view using the updated current location and direction of airplane B.

Figure 7:
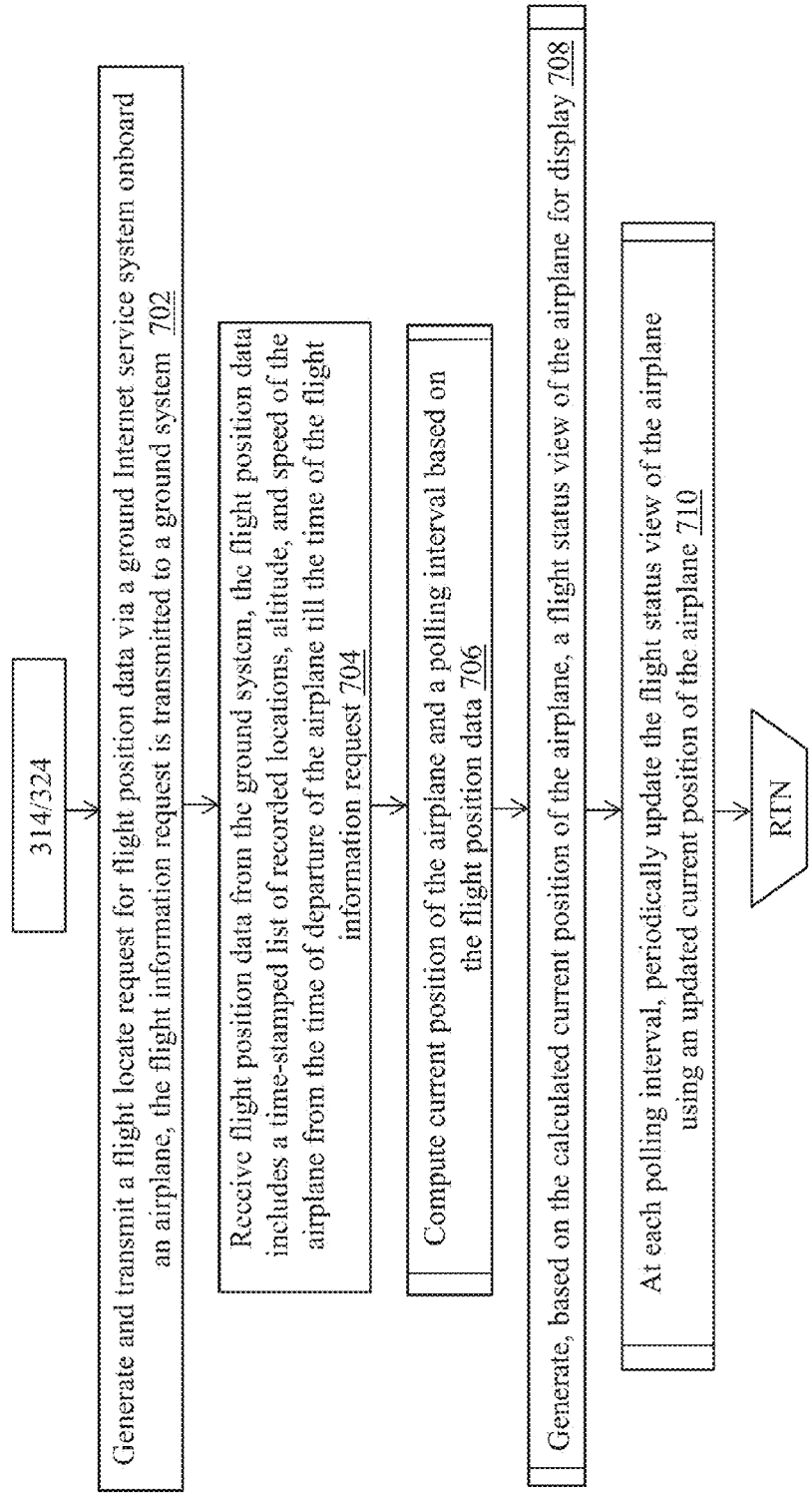
FIG. 7 is a flowchart that illustrates an example method of generating and presenting the interactive flight status display based on data received via a ground Internet service system in accordance with an example embodiment.
Figure 8A:
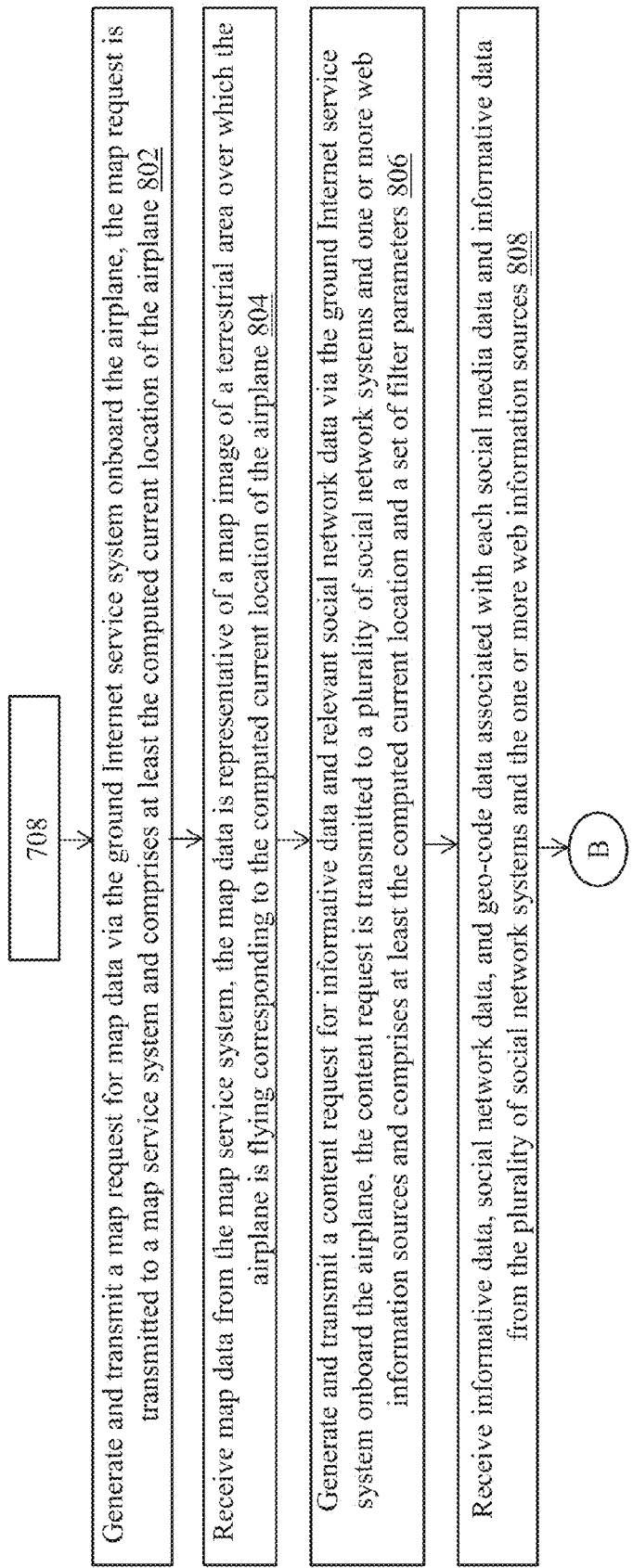
FIGS. 8A and 8B (collectively 'FIG. 8') are flowcharts that illustrate an example method associated with the generation of the flight status view based on data received via a ground Internet service system in accordance with an example embodiment.
Figure 8B:
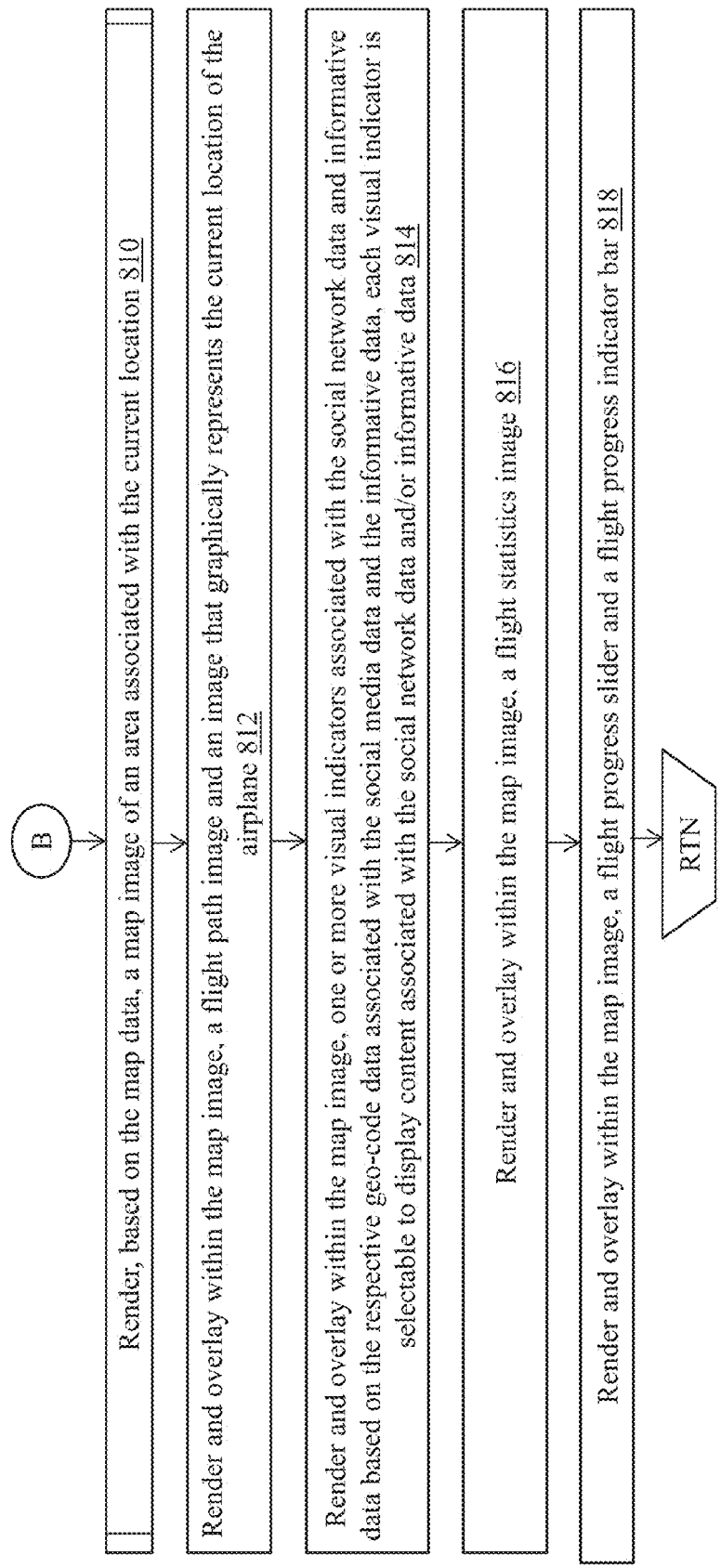
Figure 9:
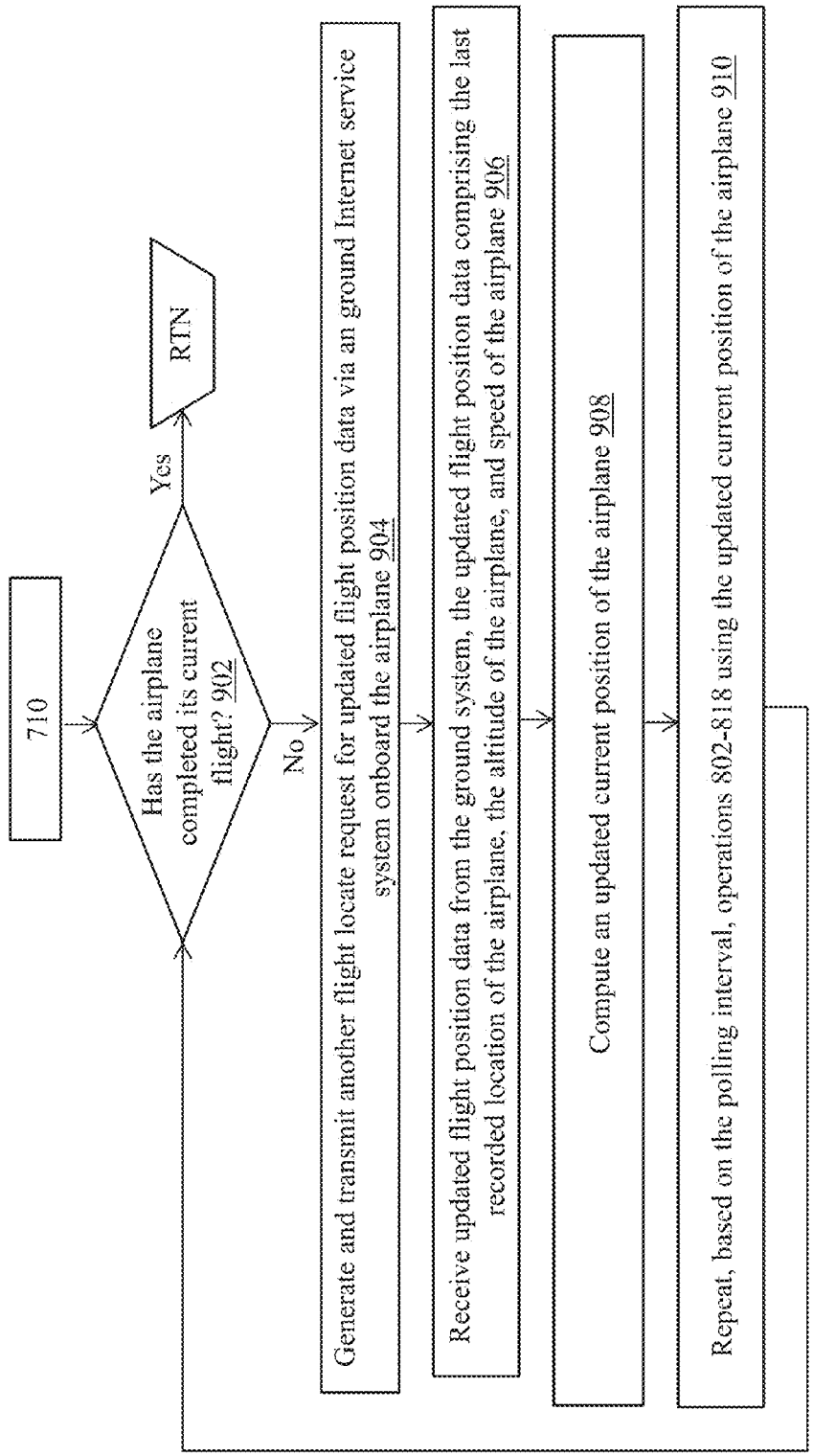
FIG. 9 is a flowchart that illustrates a process of updating the flight status view that generated based on data received via a ground Internet service system in accordance with an example embodiment in accordance with an example embodiment.

FIGS. 7-9 are flowcharts that illustrate an example method of generating and presenting the interactive flight status display to a user 118 on the ground based on data received via a ground Internet service system 114. The operations illustrated of FIGS. 7 and 9 are mostly similar to their matching respective operations of FIGS. 4 and 6, respectively, except that in each operation of FIGS. 7 and 9, the application engine 101 receives and transmits data over the Internet 110 via the ground Internet service system 114. Accordingly, FIGS. 7 and 9 will not be described herein for brevity and to avoid repetition. Similarly, the operations 802-814, and 818 of FIG. 8 are mostly similar to their matching respective operations 502-514, and 518 of FIG. 5, except that in operations 802-814, and 818, the application engine 101 receives and transmits data over the Internet via the ground Internet service system 114. Accordingly, operations 802-814, and 818 of FIG. 8 will not be described herein for brevity and to avoid repetition. However, operation 816 may differ from its respective matching operation 516 of FIG. 5. In particular, in operation 816, the graphics rendering engine 230 may not render a selectable image that provides a user with an option to post and/or share information on one or more social network platforms. Accordingly, the selectable image that provides a user with an option to post and/or share information, e.g., Facebook® share option 1420 may be omitted from a flight status view 1400*b* presented to the user 118 on the ground. FIG. 14B illustrates a flight status view 1400*b* that is presented to the user 118 on the ground. One of ordinary skill in the art can understand and appreciate that any appropriate features may be deleted or added to the flight status view 1400*b* presented to the user 118 on the ground, without departing from a broader scope of this disclosure. The feature of providing an option to the user to post and/or share data on a social network platform is described below in greater detail in association with FIG. 12.

Figure 12:
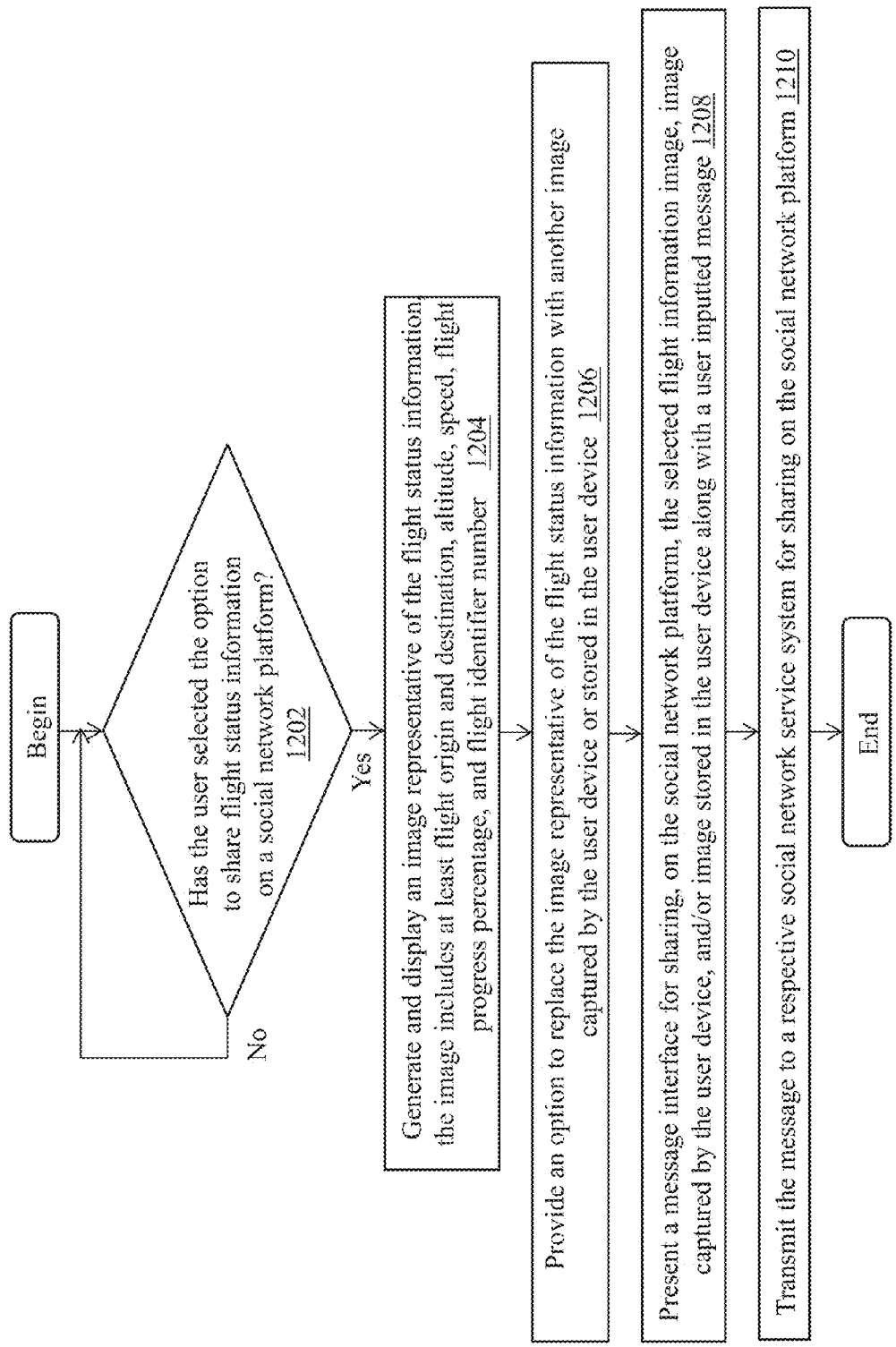
FIG. 12 is a flowchart that illustrates an example method of sharing data on a social network platform via the interactive flight status display in accordance with an example embodiment.

Turning to FIG. 12, this figure is a flowchart that illustrates an example method of sharing data on a social network platform via the interactive flight status display in accordance with an example embodiment. FIG. 12 will be discussed, making exemplary references to FIGS. 14A, 14B, and 14C as may be appropriate or helpful. In operation 1202, the application engine 110 may operate in conjunction with the input/output engine 238 of the personal computing device 106 to check if the user has selected the social network share/post image 1420 (shown in FIG. 14A). In other words, the application engine 101 determines if the user has opted to share and/or post data on one or more social network platforms through the interactive flight status display. If the user has not opted to share and/or post data on one or more social network platforms, the application engine 101 may continue waiting till the user opts to share and/or post data on one or more social network platforms through the interactive flight status display. Upon determining that the user has opted to share and/or post data on one or more social network platforms, in operations 1204 and 1206, the application engine 101 may generate and display a preview image along with options to change an image, e.g., preview image 1426 and options 1428-1430 as illustrated in FIG. 14B.

Turning to FIG. 14B, this figure illustrates a preview image associated with a social network sharing/posting feature of the interactive flight status display in accordance with an example embodiment. In one example embodiment, the preview image 1426 may include a flight information image 1427 by default, as illustrated in FIG. 14B. The flight information image 1427 may provide the current position, the current direction, the percentage of travel completed by the airplane, and other details associated with the flight, such as flight identifier number, arrival/destination port, and so on. In addition, the preview image 1426 may include one or more selectable options 1428-143 as illustrated in FIG. 14B. The first option 1428 may allow the user 108 to select the flight information image 1427 for posting and/or sharing on the one or more social network platforms. The second option 1430 may allow the user 108 to select an image captured by the personal computing device 106 for posting and/or sharing on the one or more social network platforms. The third option 1432 may allow the user 108 to select an image stored in the personal computing device 106 for posting and/or sharing on the one or more social network platforms. One of ordinary skill in the art can understand and appreciate that the additional options may be included in the preview image 1426.

In one example embodiment as illustrated in FIG. 14B, the preview image 1426 may include the flight information image 1427 by default. Accordingly, the option 1428 to select the flight information image 1427 for posting and/or sharing on the one or more social network platforms is disabled, as illustrated in FIG. 14B. If the user 108 desires to replace the flight information image 1427 with an image captured using the personal computing device 106 or an image stored in the personal computing device 106, the user 108 may do so by selecting options 1430 or 1432, respectively. Further, as illustrated in FIG. 14B, the preview image 1426 may include another option 1429 (e.g., the 'Next' button) that allows the user 108 to proceed with posting the selected image to one or more social network platforms.

Accordingly, after the user has selected the image that the user wants to post, the user 108 may select the option 1429 to proceed with posting the selected image.

Figure 14C:
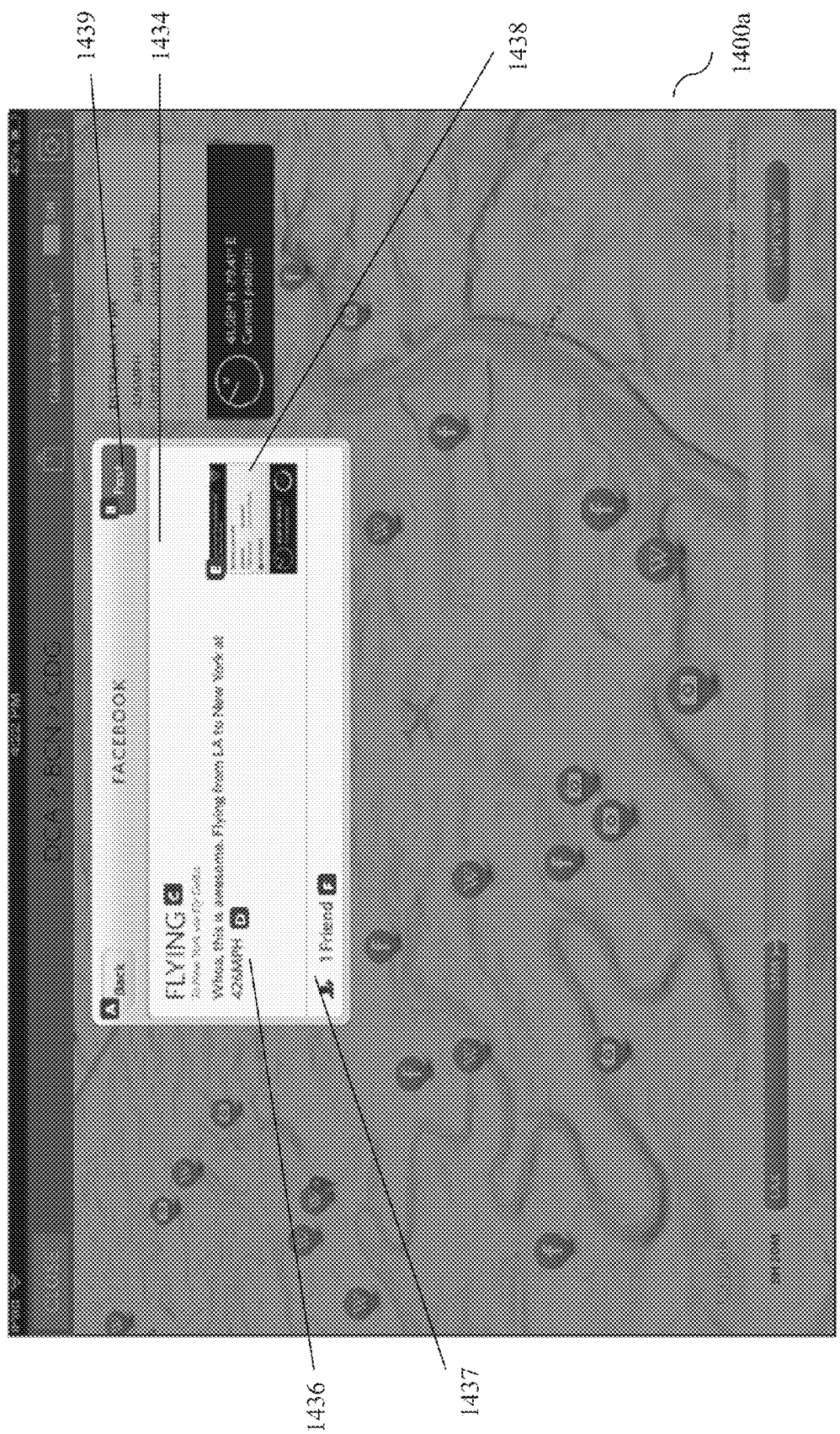
Figure 14D:
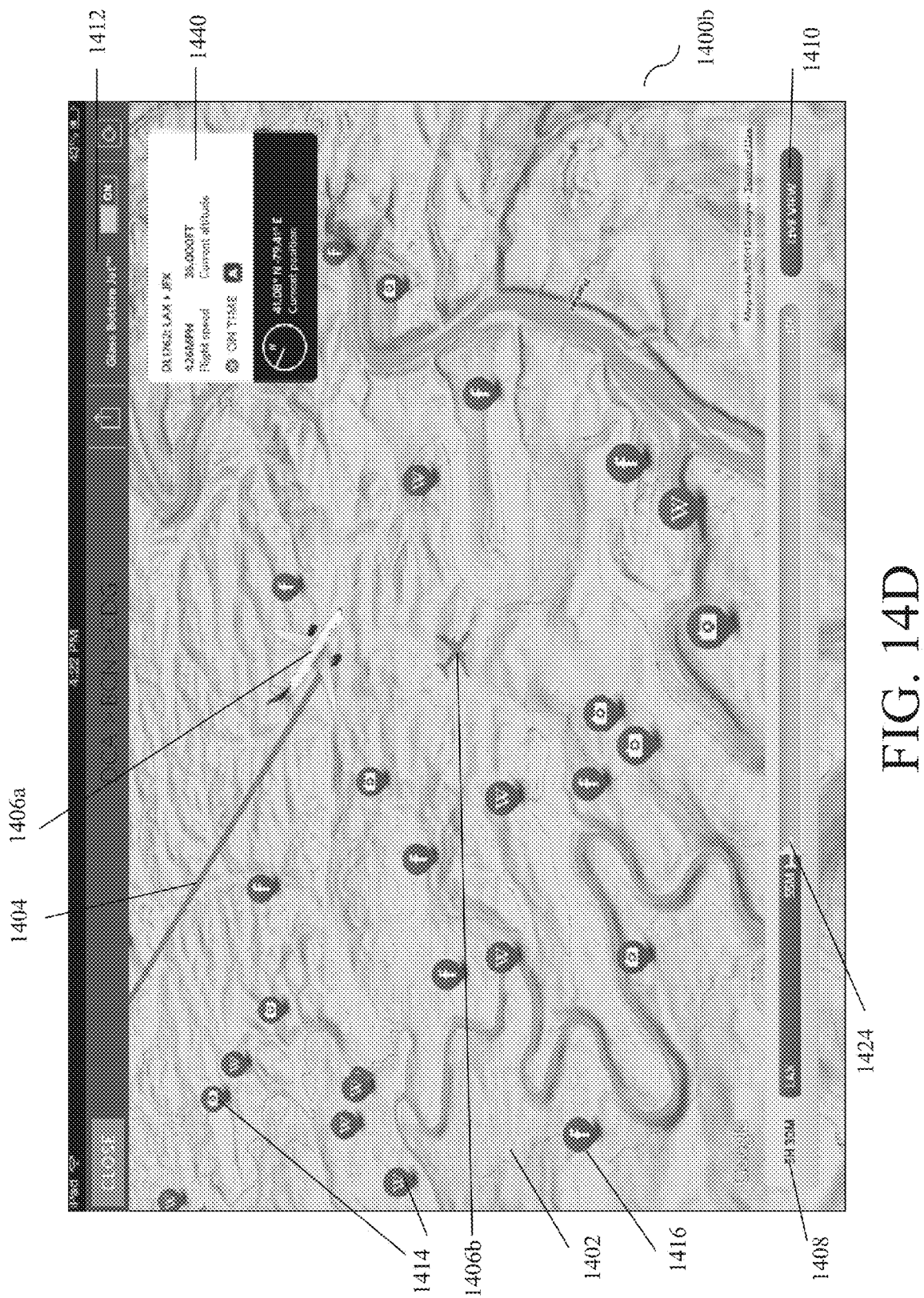
Figure 14E:

Responsive to selecting the option to proceed with posting an image on one or more social network platforms, in operation 1208, the application engine 101 generates and displays a message interface to the user 108, e.g., message interface 1434 as illustrated in FIG. 14C. Turning to FIG. 14C, this figure illustrates a message interface associated with a social network sharing/posting feature of the interactive flight status display in accordance with an example embodiment. In particular, the message interface 1434 may include a portion 1438 that presents the flight information image; the image captured using the personal computing device 106; the image stored in the personal computing device 106; and/or any image selected by the user in operation 1206, i.e., the preview image mode illustrated in FIG. 14B. Further, the message interface 1434 may include a portion 1436 that presents a user entered message. In particular, a user 108 may be provided with an option to enter a message that is to be posted or shared on the one or more social network platforms. The message may be inputted through a software keyboard (touchscreen keypad), a hardware keyboard native to the personal computing device 106, or an external keyboard. In addition to the user entered message, the message interface 1434 may include a message that is automatically populated by the application engine 101. In one example, the message that is automatically populated may include the name of the airline that the user is flying on, a destination name, and so on. Additionally, in one example embodiment, the message interface 1434 may include an option 1037 to tag friends. Upon selecting the option 1037, the user may be provided with a list of social network friends. Responsively, the user may choose one or more friends for tagging to the message. On the basis of the number of friends selected by the user, the message interface may present a count of the number of friends tagged to the message. Finally, the user may select option 1039 to push the message to the social network platform for posting and/or sharing. Responsive to selection the option to push the message to the social network platform, in operation 1210, the application engine 101 may transmit the message to one or more social network platforms. Consequently, the message may be posted or shared on the one or more network platforms.

One of ordinary skill in the art can understand and appreciate that the features, the architecture, the layout, and arrangement of the preview image and the message interface are examples and are not limiting. That is, the features, the architecture, the layout, and arrangement of the preview image and the message interface may vary based on the social network platform. For example, the features, the architecture, the layout, and the arrangement of the preview image and/or the message interface of FIGS. 14B and 14D are associated with Facebook®. For Twitter® or Google Plus®, the features, the architecture, the layout, and arrangement of the preview image and the message interface may differ from that of Facebook®. Further, even though FIGS. 14B and 14D illustrate images and messages being posted on a social network platform, one of ordinary skill in the art can understand and appreciate that any other form of data, such as video or audio may also be posted without departing from a broader scope of this disclosure.

Figure 13:
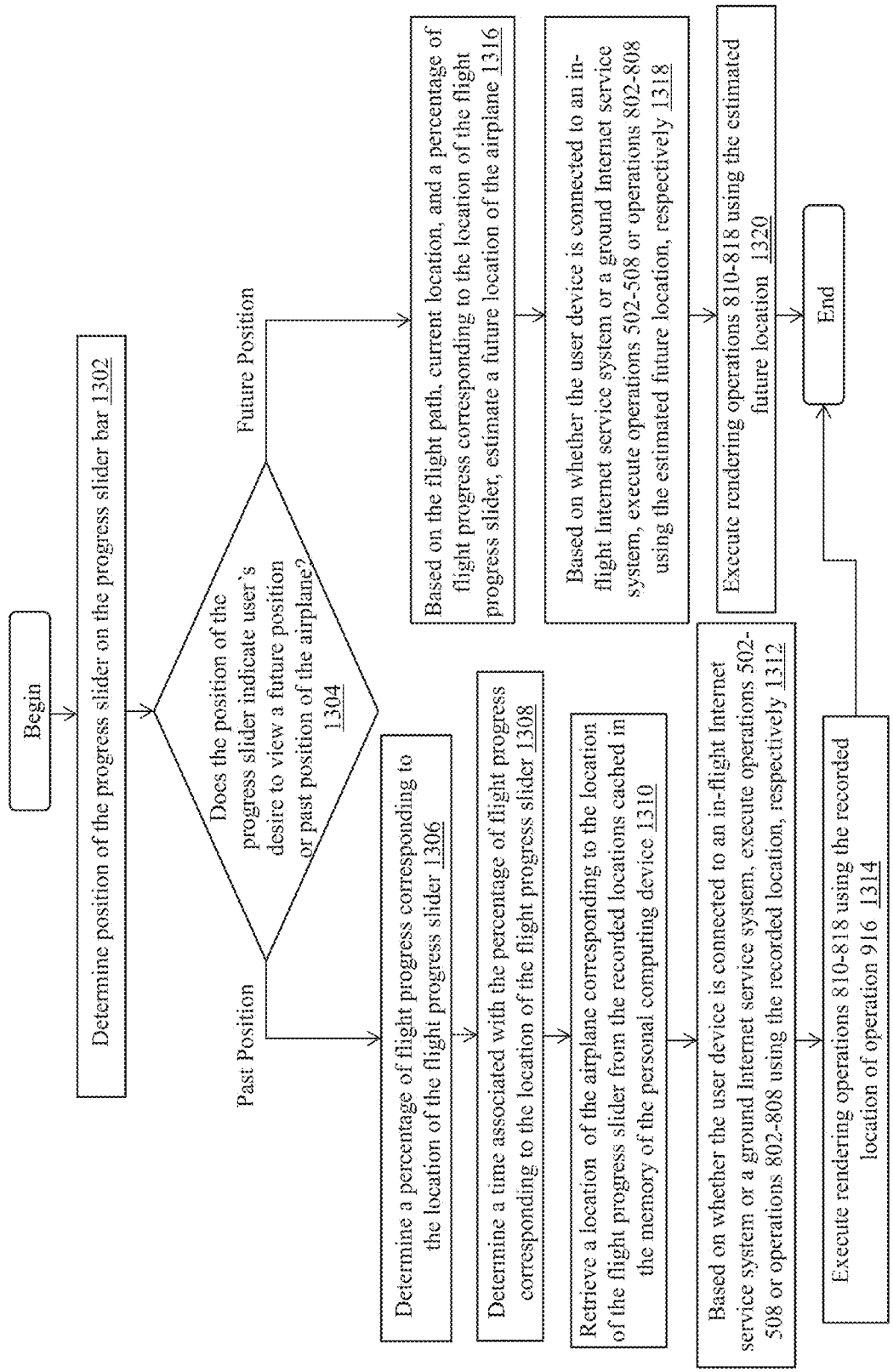
FIG. 13 is a flowchart that illustrates a process associated with a flight progress slider bar of the interactive flight status display in accordance with an example embodiment.

Turning to FIG. 13, this figure is a flowchart that illustrates a process associated with a flight progress slider bar of the interactive flight status display in accordance with an example embodiment. In operations 1302 and 1304, the progress slider engine 226 determine a position of the slider 1424 to check if the user desires to view a future position of the airplane 102 or a past position of the airplane 102. If the position of the slider 1424 indicates that the user desires to view a past position of the airplane, the progress slider engine 226 proceeds to operation 1306. In operation 1306, the progress slider engine 226 determines a percentage of travel completed by the airplane 102 corresponding to the location of the slider 1424. Further, in operation 1308, the progress slider engine 226 may determine a time associated with the percentage of travel completed by the airplane 102. In one example embodiment, the time may be determined by taking the actual percentage of travel completed by the airplane 102 and dividing that by the percent location of the slider 1424. Then, using the time associated with the percentage of travel completed, in operation 1310, the progress slider engine 226 may retrieve, from the list of locations that are cached in the memory, a location corresponding to the calculated time.

Responsive to obtaining a location corresponding to the slider position 1424, the progress slider engine 226 may determine if the personal computing device is connected to the Internet via the in-flight Internet service system 104 or the ground Internet service system 114. If the personal computing device is connected to the Internet via the in-flight Internet service system 104, in operation 1312, the progress slider engine 226 may execute operations 502-508 using the location corresponding to the slider position 1424. Alternatively, if the personal computing device is connected to the Internet via the ground Internet service system 104, in operation 1312, the progress slider engine 226 may execute operations 802-808 using the location corresponding to the slider position 1424.

Responsive to executing operations 502-508 or 802-808, the position slider engine 226 receives map data, social network data, and/or informative data. Using the received data and the location corresponding to the slider position 1424, in operation 1314, the progress slider engine 226 executes operations 810-818 to render a flight status view 1400b that does not include the option to post and/or share data on a social network platform.

However, in operation 1304, if the position of the slider 1424 indicates that the user desires to view a future position of the airplane, the progress slider engine 226 may proceeds to operation 1316. In operation 1316, the progress slider engine 226 may estimate a future location of the airplane corresponding to the location of the slider 1424. In one embodiment, the progress slider engine 226 may use a mathematical and/or a geometric model to determine the future location of the airplane corresponding to the location of the slider 1424. The input to the mathematical and/or geometric model may include, but is not limited to the flight path of the airplane, the current location of the airplane, a destination, and a percentage of the travel corresponding to the location of the slider 1424. In another embodiment, the progress slider engine 226 may determine the future location of the airplane using a planned path. In yet another embodiment, upon determining that the user desires to view a future position of the airplane, the progress slider engine 226 may set the future location as the destination point to which the airplane 102 is travelling.

Responsive to estimating the future location, the progress slider engine 226 may determine if the personal computing device is connected to the Internet via the in-flight Internet service system 104 or the ground Internet service system 114. If the personal computing device is connected to the Internet via the in-flight Internet service system 104, in operation 1318, the progress slider engine 226 may execute operations 502-508 using the estimated future location. Alternatively, if the personal computing device is connected to the Internet via the ground Internet service system 104, in operation 1318, the progress slider engine 226 may execute operations 802-808 using the estimated future location.

Responsive to executing operations 502-508 or 802-808, the position slider engine 226 receives map data, social network data, and/or informative data. Using the received data and the estimated future location, in operation 1320, the progress slider engine 226 executes operations 810-818 to render a flight status view 1400b that does not include the option to post and/or share data on a social network platform.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or in Digital Signal Processor (DSP) circuitry).

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. An application engine comprising:
   a request generation engine configured to receive flight position data associated with an airplane through a global computing network, the flight position data comprising at least a list of recorded locations of the airplane and a timestamp associated with each recorded location in the list;
   a position engine configured to compute a current position of the airplane and a polling interval based on the list of the recorded locations of the airplane,
      wherein the position engine is configured to:
         select, from the list of recorded locations, a recorded location other than a latest recorded location;
         setting the selected recorded location as the current location of the airplane;
         calculate a direction of the airplane using one or more recorded locations from the list of recorded locations and the selected location;
         calculate, based on the timestamps associated with each recorded location, an average time difference between a time of recording of subsequent locations in the list of recorded locations; and
         set the average time difference as the polling interval;
   a graphics rendering engine configured to generate a flight status view of the airplane based on the current position of the airplane, wherein the flight status view is rendered on a computing device; and
   a polling engine configured to periodically update the flight status view of the airplane using an updated current position of the airplane, wherein the polling interval determines a rate at which the flight status view is updated.

2. The application engine of claim 1, wherein the flight status view comprises:
   a flight tracker image that is representative of the current position of the airplane and a flight path of the airplane; and
   one or more visual indicators, each visual indicator representative of at least one of a social network data and an informative data associated with the current position of the airplane.

3. The application engine of claim 2, wherein to generate the flight status view, the graphics rendering engine is configured to:
   receive map data associated with an area corresponding to the current position of the airplane, the map data is received from a map service system over the global computer network in response to a map request;
   receive at least one of social network data and informative data associated with the area corresponding to the current position of the airplane, the at least one of the social network data and informative data is received from one or more social network service systems and information sources over the global computer network in response to a content request;
   based on the map data, the flight position data, and the current position of the airplane, render the flight tracker image; and
   based on the at least one the social network data and the informative data render one or more visual indicators, each visual indicator representative of at least one of the social network data and the informative data associated with the current position of the airplane.

4. The application engine of claim 1, wherein the flight status view comprises an image representative of a percentage of travel completed by the airplane.

5. The application engine of claim 3, wherein the image representative of the percentage of travel completed by the airplane is a progress indicator bar with a slider that is controllable by a user to view at least one of a past position of the airplane and a future position of the airplane.

6. The application engine of claim 1, wherein to render the flight tracker image, the graphics rendering engine is configured to:
   render a first image representative of a map of an area corresponding to the current position of the airplane;
   render a second image representative of the flight path of the airplane;
   render a third image representative of the current position of the airplane, and an image representative of a percentage of travel completed by the airplane.

7. The application engine of claim 1, further comprising:
a network determination engine configured to determine one or more technical specifications associated with a display of the computing device,
wherein a complexity of the flight status view is adjusted based on the one or more technical specifications of the computing device, and
wherein the complexity is representative of a number of dimensions in which the flight status view is displayed.

8. A method comprising:
receiving, by an application engine, flight position data associated with an airplane through a global computing network, the flight position data comprising at least a list of recorded locations of the airplane and a timestamp associated with each recorded location in the list;
computing, by the application engine, a current position of the airplane based on the list of the recorded locations of the airplane,
wherein calculating the current position comprises:
selecting, from the list of recorded locations, a recorded location other than a latest recorded location;
setting the selected recorded location as the current location of the airplane; and
determining a direction of the airplane using one or more recorded locations from the list of recorded locations;
computing, by the application engine, a polling interval based on the list of the recorded locations of the airplane,
wherein computing the polling interval comprises:
calculating, based on the timestamps associated with each recorded location, an average time difference between a time of recording of subsequent locations in the list of recorded locations; and
setting the average time difference as the polling interval;
based on the current position of the airplane, generating, by the application engine, a flight status view of the airplane for display, wherein the flight status view is rendered on a computing device; and
periodically updating, by the application engine, the flight status view of the airplane using an updated current position of the airplane, wherein the polling interval determines a rate at which the flight status view is updated.

9. The method of claim 8, wherein the flight status view comprises:
a first image representative of a map of an area corresponding to the current position of the airplane;
a second image representative of a flight path of the airplane;
a third image representative of the current position of the airplane; and
one or more visual indicators, each visual indicator representative of at least one of a social network data and informative data associated with the current position of the airplane.

10. The method of claim 8, wherein the flight status view comprises an image representative of a percentage of travel completed by the airplane.

11. The method of claim 10, wherein the image representative of a percentage of travel completed by the airplane is a progress indicator bar with a slider that is controllable by a user to view at least one of a past position of the airplane and a future position of the airplane.

12. The method of claim 8, wherein the global computer network is Internet, and wherein the global computer network is accessible via one of an in-flight Internet service system and a ground Internet service system.

13. The method of claim 8, wherein generating the flight status view comprises:
receiving map data associated with an area corresponding to the current position of the airplane, the map data is received from a map service system over the global computer network in response to a map request;
receiving at least one of social network data and informative data associated with the area corresponding to the current position of the airplane, the at least one of the social network data and informative data is received from one or more social network service systems and information sources over the global computer network in response to a content request;
based on the map data, rendering a first image representative of a map of the area corresponding to the current position of the airplane;
based on the flight position data and the current position of the airplane, rendering a second image representative of a flight path of the airplane, a third image representative of the current position of the airplane, and an image representative of a percentage of travel completed by the airplane; and
based on the at least one social network data and the informative data rendering one or more visual indicators, each visual indicator representative of at least one of a social network data and informative data associated with the current position of the airplane.

14. The method of claim 13, wherein the social network data and the informative data include at least a geo-code that is used to locate their respective visual indicators in the first image.

15. The method of claim 13, wherein the informative data includes at least one of one or more images, information associated with a location, advertisements, and events and/or activities.

16. The method of claim 13, wherein the social network data includes at least one of a location associated with a user's social network friend and a location that a user's social network friend has visited.

17. The method of claim 13, wherein the social network data includes at least one of an image, a text, and a video associated with a social network platform.

18. The method of claim 8, further comprising providing an option within the flight status view to share data on one or more social network platforms.

19. The method of claim 8, further comprising:
determining, by the application engine, one or more technical specifications associated with a display of a computing device,
wherein a complexity of the flight status view is adjusted based on the one or more technical specifications of the computing device, and
wherein the complexity is representative of a number of dimensions in which the flight status view is displayed.

* * * * *